United States Patent
Cassada

[11] 3,947,825
[45] Mar. 30, 1976

[54] ABSTRACTING SYSTEM FOR INDEX SEARCH MACHINE

[75] Inventor: Thomas Edward Cassada, Lexington, Ky.

[73] Assignee: International Business Machines Corporation, Armonk, N.Y.

[22] Filed: May 7, 1975

[21] Appl. No.: 575,318

Related U.S. Application Data

[63] Continuation-in-part of Ser. No. 350,880, April 13, 1973, which is a continuation-in-part of Ser. No. 157,565, June 28, 1971.

[52] U.S. Cl. .......................................... 340/172.5
[51] Int. Cl.² ......................................... G06F 1/00
[58] Field of Search ......... 340/172.5; 197/19; 271/9

[56] References Cited
UNITED STATES PATENTS

| | | | |
|---|---|---|---|
| 3,309,677 | 4/1967 | Montgomery et al. | 340/172.5 |
| 3,417,379 | 12/1968 | Heard et al. | 340/172.5 |
| 3,577,127 | 4/1971 | Bishop et al. | 340/172.5 |
| 3,598,396 | 8/1971 | Andrews et al. | 271/9 |
| 3,674,125 | 7/1972 | Kolpek | 197/19 |

*Primary Examiner*—Raulfe B. Zache
*Attorney, Agent, or Firm*—D. Kendall Cooper

[57] ABSTRACT

The invention concerns a system of English language abstracting used to increase the search rate for an Index Search machine that, as an example makes use of magnetic record cards each having in a typical case 50 tracks for recording of information. To increase the rate at which groups of words can be compared, an abstract of each group of words is generated. On the magnetic card the text or groups of words are recorded on tracks 2 through 50 and the abstracts of these groups are recorded in track 1. When searching for a particular group of words, an abstract is generated for the group being sought. This abstract is then compared to the abstracts on track 1 of each card. If any of the abstracts match, the corresponding group of words on the card are searched in detail. For abstracts that do not match there is no need to search the corresponding group of words. Therefore, the need to search every group of words is eliminated, thus increasing the search rate.

The abstracts are generated from the first and third characters of each word in the group of words. Each character to be used in the generation of the abstract is encoded into one of three groups which are equally probable over the distribution of characters in the English Language. The abstract for a group of words consists of the number of characters that fall in each of the three groups.

57 Claims, 34 Drawing Figures

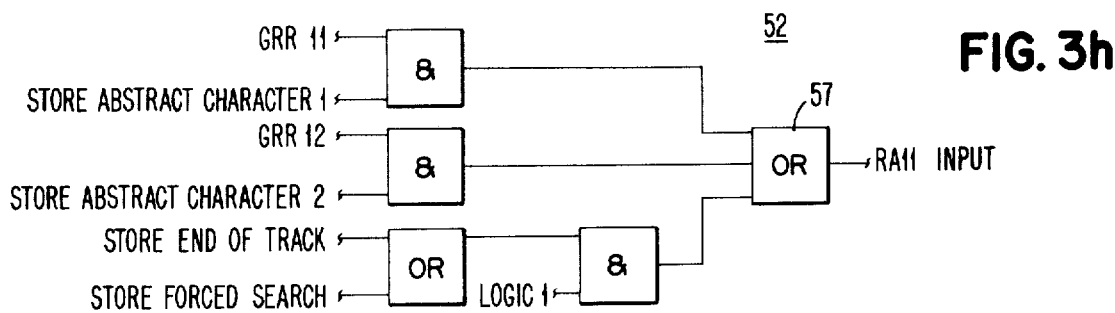
FIG. 3h
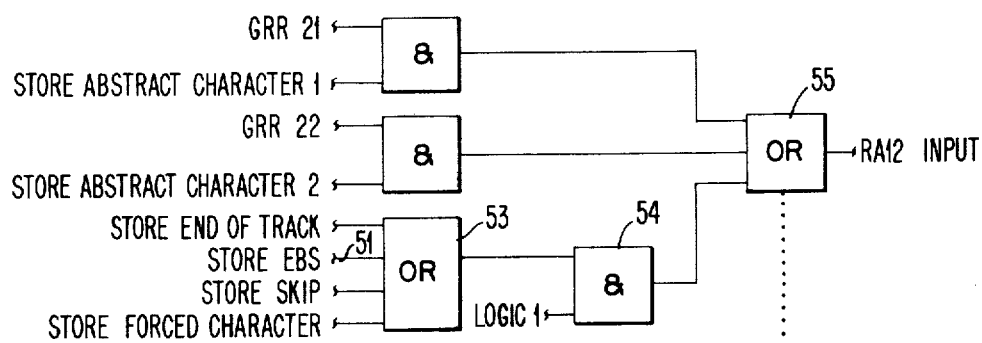
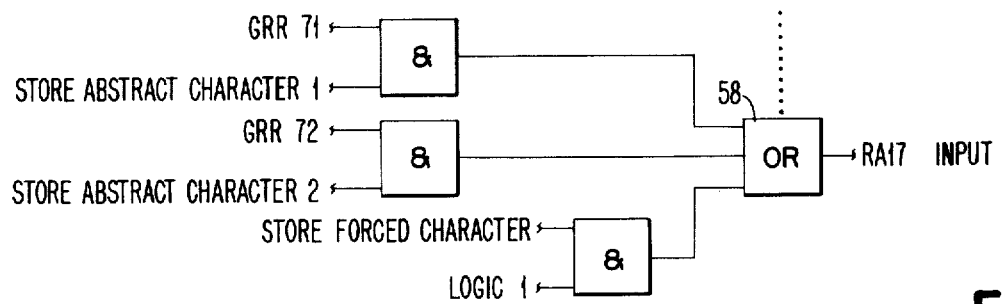
FIG. 3i
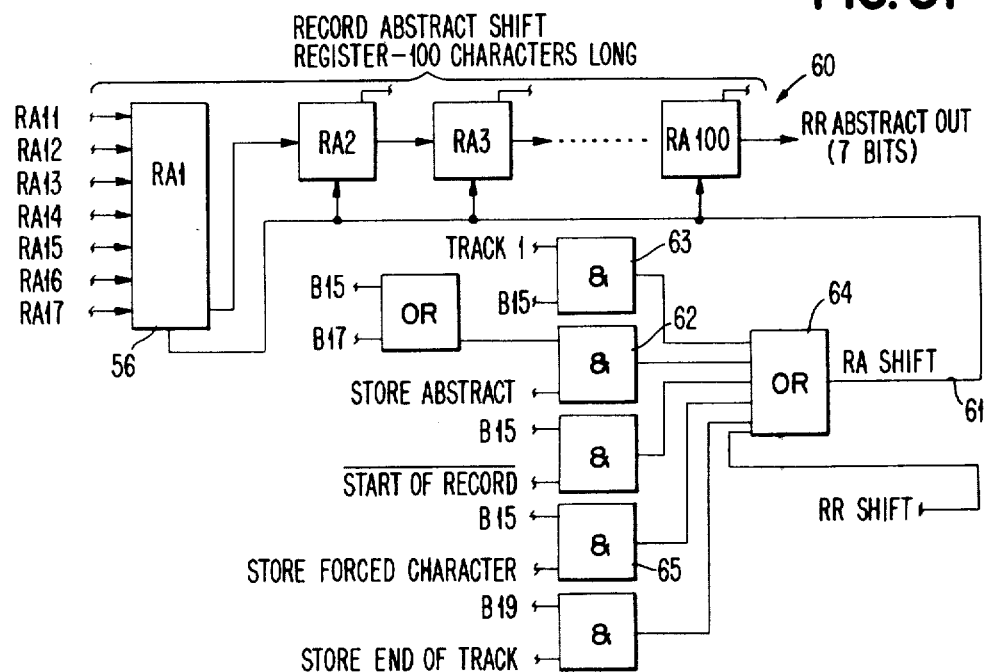

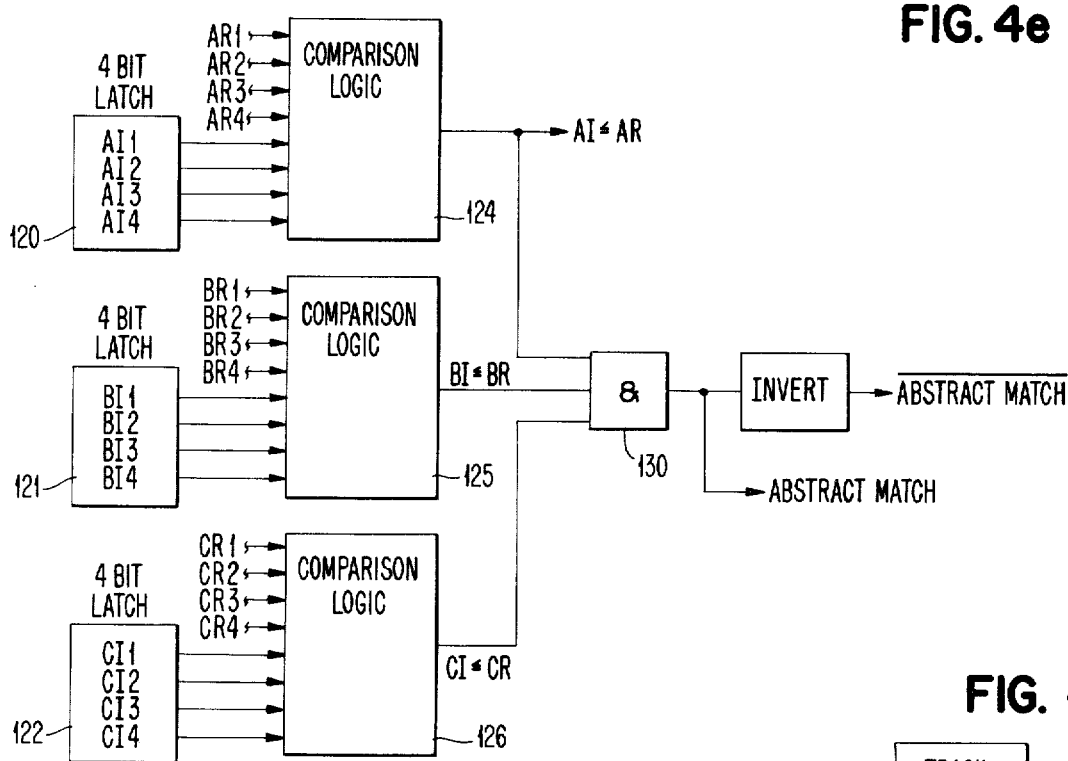
FIG. 4e
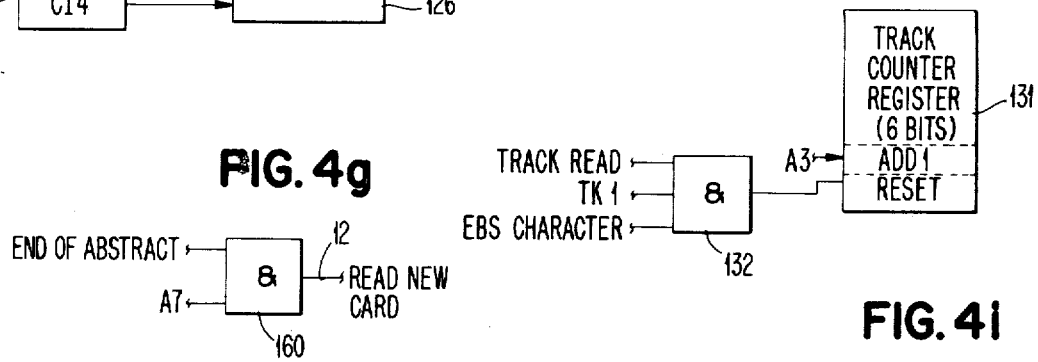
FIG. 4f
FIG. 4g
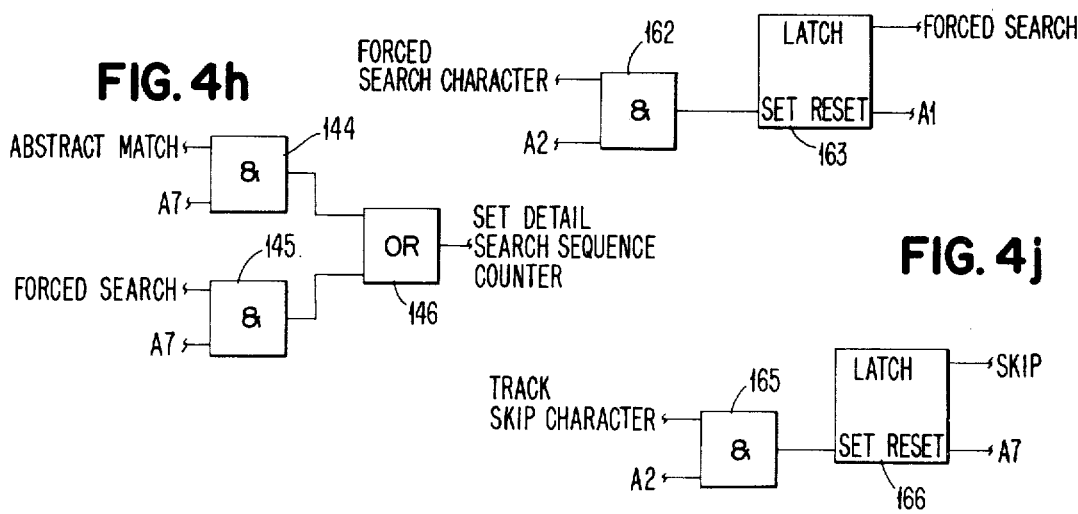
FIG. 4i
FIG. 4h
FIG. 4j

GROUP A DECODE

COMBINATIONAL DECODE

| CHARACTER | _____CODE LINES_____ | | | | | | |
|---|---|---|---|---|---|---|---|
| | L1 | L2 | L3 | L4 | L5 | L6 | L7 |
| B | 0 | 0 | 1 | 0 | 0 | 0 | 1 |
| b | 0 | 0 | 1 | 0 | 0 | 0 | 0 |
| K | 0 | 0 | 1 | 0 | 0 | 1 | 1 |
| k | 0 | 0 | 1 | 0 | 0 | 1 | 0 |
| N | 0 | 1 | 1 | 0 | 0 | 1 | 1 |
| n | 0 | 1 | 1 | 0 | 0 | 1 | 0 |
| T | 1 | 1 | 1 | 0 | 0 | 1 | 1 |
| t | 1 | 1 | 1 | 0 | 0 | 1 | 0 |
| E | 1 | 0 | 1 | 0 | 0 | 1 | 1 |
| e | 1 | 0 | 1 | 0 | 0 | 1 | 0 |
| H | 1 | 0 | 1 | 0 | 0 | 0 | 1 |
| h | 1 | 0 | 1 | 0 | 0 | 0 | 0 |

ABSTRACTING SYSTEM FOR INDEX SEARCH MACHINE

This case is a continuation-in-part of U.S. patent application Ser. No. 350,880, filed Apr. 13, 1973, which in turn is a continuation-in-part of U.S. patent application Ser. No. 157,565, filed June 28, 1971, both having the same title as the present case.

The system provides means by which characters are encoded, the abstracts generated and compressed to be recorded on magnetic card, and the abstracts are compared to each other. A designated force search code is used to handle the situations in which a group of words exceeds th capacity of the abstracting system and a track skip code is used to handle groups of words which are recorded on more than one track.

REFERENCES

The following patents and applications are of interest:

U.S. Pat. No. 3,260,340, Henry C. Locklar and Donald E. Sims, inventors; entitled "Revision System for Data Recording and Printing Apparatus."

U.S. Pat. No. 3,297,124, Donald E. Sims, inventor; entitled "Data Recording and Printing Apparatus Capable of Responding to Changed Format."

U.S. Pat. No. 2,919,002, L. E. Palmer, inventor; entitled "Selection Mechanism for a Single Printing Element Typewriter."

U.S. Pat. No. 3,082,854, F. E. Becker, et al., inventors, entitled "Typewriter Input Checking Mechanism."

U.S. Pat. No. 3,309,677, C. A. Montgomery, et al., inventors; entitled "Automatic Information Indexing."

U.S. Pat. No. 3,577,127, David A. Bishop, et al., inventors; entitled "Composer System for Processing Data In Parallel Columns."

U.S. Pat. No. 3,417,379, R. S. Heard, et al., inventors; entitled "Clocking Circuits for Memory Accessing and Control of Data Processing Apparatus."

U.S. Pat. No. 3,674,125, with Robert A. Kolpek, inventor; entitled "Data System with Printing, Composing, Communications, and Magnetic Card Processing Facilities."

U.S. Pat. No. 3,598,396, with L. H. Robbins, inventor; entitled "Record Card Handling Device with Multiple Feed Paths."

OTHER REFERENCES

The following additional references are of interest;

IBM Customer Engineering Instruction Manual for the "Selectric"* Printer, Form Number 241-5032-2, dated January, 1966.

(*Trademark)

IBM Customer Engineering Manual of Instruction for "Selectric" Input/Output Keyboard Printer, Form Number 241-5159, dated 1965.

IBM Customer Engineering Universal Reference Manual for "Selectric" Input/Output Keyboard Printer, Form Number 241,5182, dated June 30, 1963.

IBM Customer Engineering Instruction Manual for Magnetic Tape "Selectric" Typewriter (MT/ST), Form Number 241-5194.

IBM Magnetic Tape "Selectric" Composer Customer Engineering Instruction Manual, Form Number 241-5430, copyright 1967.

BRIEF BACKGROUND OF INVENTION INCLUDING FIELD AND PRIOR ART

The present invention concerns index searching systems and particularly abstracting techniques for use in conjunction with such systems. In a typical case, an index search system incorporates a central processor or control unit having input means for entering information from storage media, such as magnetic record cards, a keyboard means for indicating to the system "inquiries" indicative of information required from the index and printing means serving as an output to provide the user of the system with information that is located corresponding to the inquiries put in the system.

A number of references of interest in the present case have been indicated above. These include the Locklar and Sims patents that illustrate systems utilizing magnetic tape record media for recording and reproducing information in conjunction with printing means. The principles of the present invention are equally applicable to tape systems. The Palmer and Becker references are illustrative of th IBM "Selectric" Typewriter printing mechanisms. Such printing mechanisms make use of a single element printing head with means for rotating and tilting the head in order to effect character selection during printing.

The Kolpek U.S. Pat. No. 3,674,125 describes a system making use of magnetic record cards for recording and reproducing information in conjunction with a printer, such as the single element printer just described. The Andrews case describes pack-feeding mechanisms for feeding a plurality of magnetic record cards at high speeds into a system for recording and reproducing information as may be required and such a pack-feed mechanism may be useful in the present system for inputting information into the system for use as an index.

The Montgomery patent relates to a system for abstracting information by utilizing an alphabetical character to designate the fact that a word falls within a predetermined group of words. This system classifies documents according to words which fall in the categories. However, the Montgomery system has no provision for recording key words of indefinite number describing an article on a search track and automatically abstracting the words comprising a search record by utilizing predetermined characters of each such words to provide information to group counters, the groups corresponding to groups of alphabetical characters having near equal distribution patterns.

The various customer engineering manuals are useful supplements in providing additional information concerning the IBM "Selectric" printer in its various forms. The IBM "Selectric" composer manual describes a processor having a magnetic tape as an input and incorporating a number of registers, accumulator circuits, various memories, address registers, and decode circuits that are comparable to circuits used in the system of the present case.

SUMMARY OF INVENTION

In accordance with the present invention, facilities are provided for generating an abstract and searching the abstract once it has been generated. As implemented, the system includes a central processor having a magnetic record card reading and recording facility for entering information into the processor and particularly in order to search the indexes that are on each individual card. A keyboard is provided in the system for making inquiries on the system concerning information required from the cards. An output printer is provided in the system for obtaining results of the index search and abstracting procedures.

The index search system is utilized by typing an inquiry on the keyboard and placing a card having an index recorded thereon in the card reader. When a search operation is begun the processor will sequentially read the index until a record is located that matches the inquiry. At this point the contents of the record containing information matching the inquiry is printed on the printer.

This invention pertains to the generation of an abstract by selecting the first and third characters of each word of a record, classifying these characters according to a group partition of the alphabet, and conditioning the resultant number of characters in each group into a format compatible with the recording medium. In addition, a means is provided for subsequently searching the said abstract to determine if a record abstract matches a keyboard inquiry abstract.

More specifically, the words of information contained in each magnetic record card are analyzed, the first and third characters of each word are categorized into predetermined groups that are arbitrarily selected predicated on frequency of use in the English Language. In a typical case, three groups designated A, B, C may be used with the number of characters falling in each group being accumulated to derive a numeric factor comprising three terms. For convenience, it may be desirable to translate the three numeric terms into two seven bit codes more easily recorded and sensed in the first track of each record card. The three terms comprising the numeric factor are the abstract for the record from which they are derived.

OBJECTS

Accordingly, an object of the present invention is to provide a more efficient technique for retrieving information that is particularly advantageous when used in conjunction with voluminous files as where information is recorded on magnetic record media.

Another object of the present invention is to provide a technique for developing an abstract that is highly accurate and representative of the information contained in a record medium, the abstract thereafter serving as a convenient tool for determining the substance of the information on the record medium.

Still another object of the present invention is to provide a technique for the abstracting of information that is predicated upon the probability of occurrence of individual characters in the language involved.

Also, the present invention has for an object the comparison of an abstract of the inquiry to the abstract of the record in order to determine whether the record in question should be searched in detail.

Still another object of the present invention is to provide special code capabilities in the system for insuring that a detailed search of records is made in the event the limitations of the abstracting scheme are exceeded.

An additional object of the present invention is to provide usage of a skip code that maintains correlation between the abstracts derived during searching of the records and physical locations on the record media.

In accordance with another aspect of the present invention, a special code is provided for indicating the presence of an abstract in the abstract track on the record medium to assist in determining whether an abstract control search is required or a detailed search is required in conjunction with the record medium involved.

A further object of the present invention is to provide a system in which compatibility with basic code configurations is assured by converting the number of characters in each abstract group to the same code configuration as the record medium itself.

The foregoing and other objects, features, and advantages of the invention will be apparent from the following more particular description of the preferred embodiment of the invention as illustrated in the accompanying drawings.

DESCRIPTION OF THE DRAWINGS

In the drawings:

FIGS. 3a–3i represent a logic implementation of the abstract recording process.

FIGS. 4a–4j illustrate a logic implementation of the abstract testing process.

SYSTEM DESCRIPTION

Figure 1:
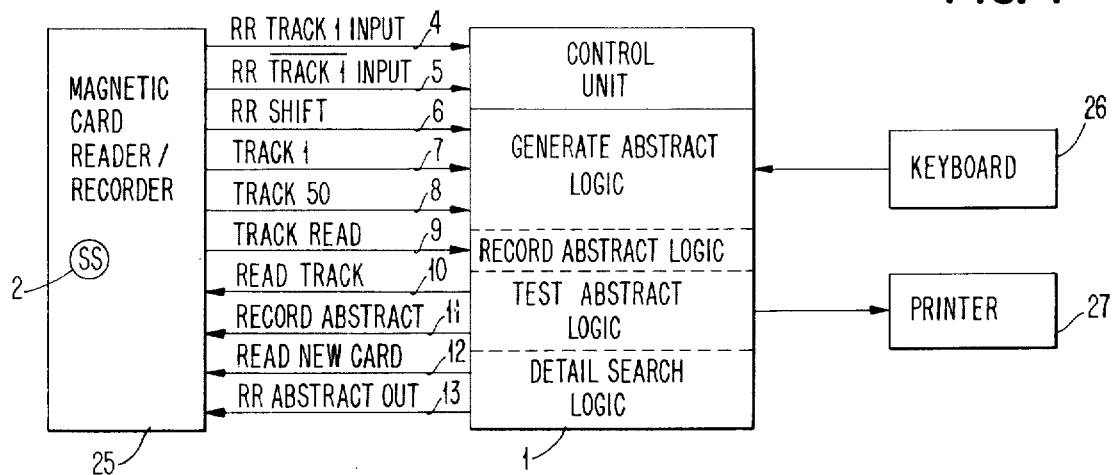
FIG. 1 is a block diagram of an index search system incorporating a control only, a magnetic card recorder/reader, a keyboard, and a printer.

FIG. 1 illustrates a typical index search system in accordance with the present invention. The system includes a control unit designated 1 with an associated magnetic card recorder/reader 25, a keyboard 26, and a printer 27.

Reference is made to the Heard U.S. Pat. No. 3,417,379 listed in the reference section for description of a system that is comparable to the system illustrated herein in FIG. 1.

As noted previously, the Kolpek system may be utilized for initially recording magnetic cards responsive to entries made by an operator at a printer keyboard. Following preparation of the cards, a plurality of cards may be inserted into a high speed pack-feed device such as that described in the Andrews case and inputted into the system of FIG. 1. Customarily, only the first track of each card is read in the present system in order to analyze the abstract present in the first track and determine what further searching and processing is required. As indicated previously, inquiries are entered into the system by means of keyboard 26, that is comparable to the keyboards set forth in the various IBM "Selectric" patents and manuals. The IBM "Selectric" printer serves very well for the printer 27 as shown in FIG. 1.

INDEX SEARCH APPLICATIONS

The following diagrams are illustrative of various fields or applications in which index searching is useful.

INDEX SEARCH APPLICATION: PATENT FILES

General Format:

/ Descriptor Field ' Primary Print Field ! Auxiliary Print Field

Specific Format:

/ Name of Inventor,Attorney,Title,Key Words ' Disclosure Number ! Location in File,Disposition Example EBS Abstract of Tk 2 thru 50
/ Cassada,Cooper,Abstracting System for the Index Search Machine '
No. 1-234567 ! 3455,File Where:
EBS is code defining the presence of an abstract
/ is beginning of record code
' (apostrophe) is beginning of primary print field code
! is beginning of auxiliary print field code Real Estate / Number of Bedrooms,Number of Bathrooms,Size of Garage,Basement,Family Room,Entrance Foyer,Cost ' Address ! Loan Information EBS Abstract
/BR 3,BA 2,GAR-2 CAR,BASE-YES,FR-YES,
 EF-YES,34,000'352 Walnut ! 5% 25 Years
/BR 4,BA 1 1/2,GAR-NO,BASE-NO,FR-YES,
 EF-NO,36,000'102 Main ! No Loan Personnel Files EBS Abstract
/ Name,Dept,Location,Man Number,Title,Sex,-Marital Status, Number of Children ' Home Address ! Phone Number Other areas making use of indexing include the following specialized files. In addition to the files just listed, the operating procedui for this general application area is similar to that for document retrieval. The difference is that the index information reveals the name, description or location of an item. The following list indicates some of these specialized indexing applications which could utilize the proposed new system.
1. Microprocessing Indexes
2. Criminal Investigations
3. Personnel Skills Inventory
4. Vendor Catalogs
5. Maintenance Scheduling
6. Insurance Customer Index
7. Medical Records Files
8. Legal Case Files
9. Management Index
10. Technical Report Files
11. Circuit Flyer Files
12. Library Index

GENERATION OF AN ABSTRACT

As previously indicated, the techniques of the present invention primarily involve the generation of an abstract and subsequently searching of such generated abstract to determine the presence of information in the index. As noted, FIG. 3 primarily concerns the index seach abstract operation while FIG. 4 is directed to generation of the abstract. It is believed useful to describe the generation of the abstract prior to an index search operation since the presence of the abstract is necessary for searching procedures.

First of all, it is assumed that a specific example in accordance with a preferred general format is as follows. The generation of an abstract is illustrated in conjunction with the information contained in tracks 2, 3, and 4 of the specific example shown.

Example of An Index of A Correspondence File On Magnetic Cards
— 1st Record Abstract
— 2nd Record Abstract
— 3rd Record Abstract
Specific Example EBS  "i
 /  ANDREWS,FILE,DETAIL,OBJECTIVES
 /  MAY,CARDWELL,PROJECT,PROFILES
 /  GREER,BORG,COST,ESTIMATE
 /

General Format

EBS  Abstract of tracks 2 thru 50
 /  AUTHOR,RECIPIENT,SUBJECT
 /
 /

Codes
EBS - Abstract Defining Character
/ - Beginning of Record Character

The following procedures are used in the generation of the abstract.

GENERATION OF AN ABSTRACT

1. Look at first and third characters of each word and classify in on of three groups (A, B, C) which are so divided to be equally probable over the English Language. (Refer to Correspondence File Example):

```
A N D --- F I L --- D E T --- O B J ---   WORDS
| |     | |     | |     | |
B C     B C     C A     B C ---   GROUP ASSIGNMENTS
```

2. Add up the number of characters that fall in each group:
 Group A = 1
 Group B = 3
 Group C = 4

3. Allow 4 binary bits for each group and form two 7 bit codes that contain the number of characters in each group:

Second Abstract Code        First Abstract Code
7 6 5 4 3 2 1              7 6 5 4 3 2 1    Code Bit Number
0 1 1 0 0 0 0              1 1 1 0 0 0 1
8   4 2 ) 8 4              2  ) 8 4 2 )    Group Bit Number Group C   Group B           Group A The sixth bit in each 7 bit code is made a 1 so that the code can not be a machine control code.

3. The 7 bit format is used because the magnetic card reader/recorder handles 7 bit characters.

4. The two abstract codes are the abstract for the first record in this example and are recorded in the second and third character positions of track 1 using the 7 bit alpha-numeric code used by the magnetic card reader/recorder.

```
    0 1 1 0 0 0 0 1 1 0 0 0
    _____/ _____/
      Second       First
    Character = "i" Character = " "
```

5. In a like manner, a two character abstract is generated for each record and recorded in two character positions on track one, with the following exceptions:
  A. If the abstract of a record contains more than 15 characters of one group, the capacity of the abstracting scheme has been exceeded. In this case, a special "forced search" character is recorded in place of the two normal abstract characters. This character will force a detailed search of this record when an Index Search Operation is being performed.
  B. If a record is on more than one track of a magnetic card, the two abstract characters are recorded in the appropriate position for the first track of the record. The character positions on track one corresponding to the remaining tracks of the record are filled with special "track skip" codes so that the spatial orientation between abstract characters and records is maintained.

The two special codes have been chosen so that they can not be the same as normal abstract codes. The following illustrates generation of the abstracts for the second and third records on the example card.

```
No. 2

M A Y   C A R   P R O   P R O       A = 0
│ │ │   │ │ │   │ │ │   │ │ │       B = 4
B   C   C   B   C   B   C   B       C = 4

No. 3

G R E   B O R   C O S   E S T       A = 4
│ │ │   │ │ │   │ │ │   │ │ │       B = 2
B   A   A   B   C   C   A   A       C = 2
```

The following procedures are used for searching of an abstract:

SEARCHING OF AN ABSTRACT

1. Assume a search for all documents pertaining to 'cost estimates.' Type an inquiry of 'cost estimate' on the keyboard.
2. Upon initiation of a search operation an abstract of the inquiry is generated.

```
C O S T   E S T I M A T E
│ │ │     │ │ │
C   C     A   A                 Group Assignments
```

3. The abstract of the inquiry is compared to the record abstract in the following manner:
where
  $Ai$ = Group A for Inquiry
  $Ar$ = Group A for Record etc.
if
  $Ar \geq Ai$ and for a particular record,
  $Br \geq Bi$ and
  $Cr \geq Ci$
that record is compared to the inquiry to see if record matches the inquiry.

If any of the three abstract criterion are not met, it is impossible for the record whose abstract is being compared to the inquiry abstract to match the inquiry. There is no reason to compare the record and the inquiry so that the number of records that must be read and compared to the inquiry is reduced, increasing the speed of the search operation.

4. For the correspondence file example the abstract search would proceed as follows:
For the first record:

| | | | |
|---|---|---|---|
| $Ar = 1 \geq Ai = 2$ | : | No | Skip this record |
| $Br = 3 \geq Bi = 0$ | : | Yes | |
| $Cr = 4 \geq Ci = 2$ | : | Yes | |

For the second record:

| | | | |
|---|---|---|---|
| $Ar = 0 \geq Ai = 2$ | : | No | Skip this record |
| $Br = 4 \geq Bi = 0$ | : | Yes | |
| $Cr = 4 \geq Ci = 2$ | : | Yes | |

For the third record:

| | | | |
|---|---|---|---|
| $Ar = 4 \geq Ai = 2$ | : | Yes | Compare this |
| $Br = 2 \geq Bi = 0$ | : | Yes | record to the |
| $Cr = 2 \geq Ci = 2$ | : | Yes | inquiry |

The subsequent comparison will show that the third record does contain the words "cost" and "estimate" and does match the inquiry and the requested information about this record will be printed on the printer.

Not all record-inquiry comparisons requested by the abstract search will result in a match, but the number of records that must be read and compared to the inquiry are reduced.

Special Codes: When a "forced search" code is encountered in the abstract the corresponding record is compared to the inquiry.

When a "track skip" code is encountered, it is known that a record of more than one track has been encountered. The "track skip" code is used to maintain the spacial orientation between the abstract and the records.

DETAILED DESCRIPTION OF LOGIC DIAGRAMS FOR INDEX SEARCHING OF AN ABSTRACT AND GENERATION OF AN ABSTRACT

Figure 2A:
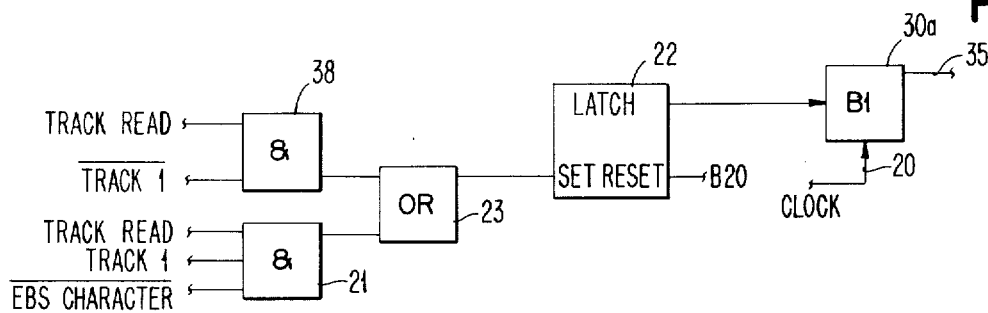
FIGS. 2a–2k represent a logic implementation of the abstract generation process.

An index search operation is begun by placing a first magnetic card with an index recorded thereon in the reader/recorder 25 and typing an inquiry on keyboard 26. A subsequent depression of Start Search (SS) button 2 causes a logic pulse to be generated on the Read New Card line 12 FIG. 1. Units 1 and 25 are interconnected by various interface control lines 4–13. In this state, the magnetic card reader/recorder 25 reads the first track of the first card, that is, the "abstract" track. The information contained on track 1 of the first card is transferred to a Read Abstract shift register 40, FIG. 4b, by way of the interface signal named RR Track 1 Input designated 4 in both FIGS. 1 and 4b. When the entire contents of track 1 of the card have been transferred to Read Abstract shift register 40, the interface line 9 labeled Track Read, FIG. 1, is driven with a logic pulse that is in phase with the clock signal shown in FIGS. 2a, 2b and 4a on line 20.

Figure 4A:
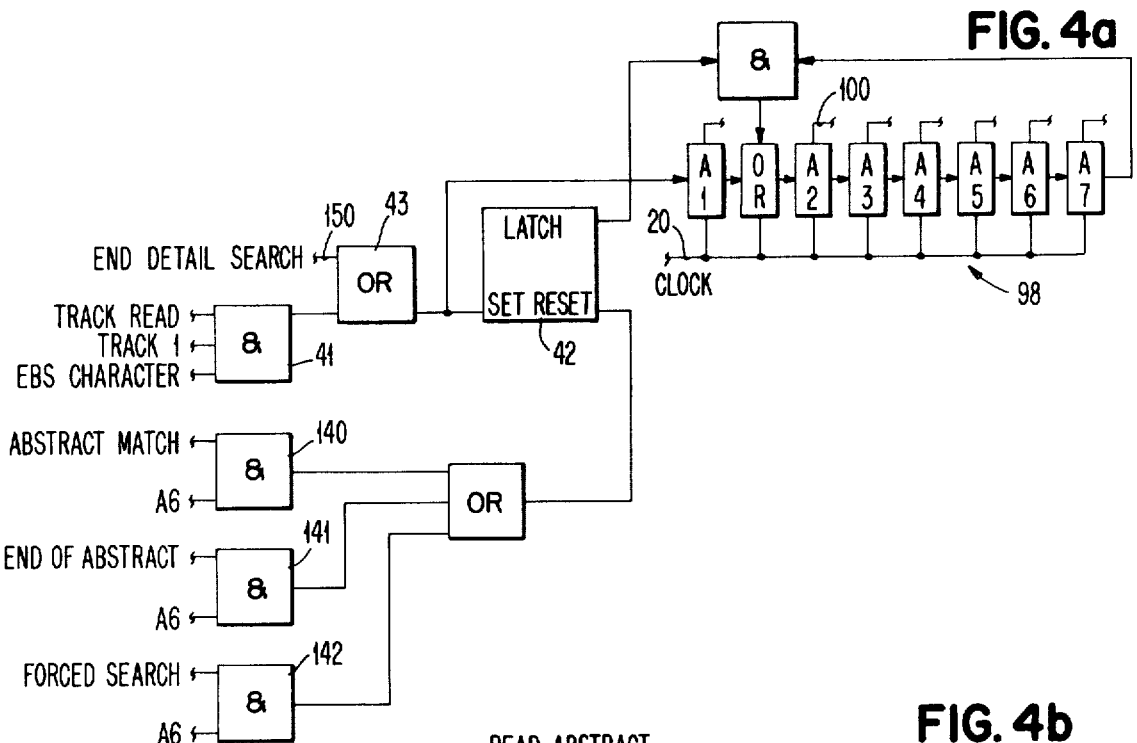

The pulse on Track Read line 9 initiates one of two operations in the control unit. If the first character of the first track that has just been read is an EBS character which is indicative that an abstract is present, And circuit 41, FIG. 4a, is conditioned and control unit 1 will enter a "Test Abstract" operation by setting of latch 42. This will be discussed subsequently. An incidental matter, EBS simply signifies an internally recognizable code, known as "*Error Correct Backspace* (EBS)."

GENERATE ABSTRACT OPERATION

If the first character of the first track just read is not an EBS character, which is assumed in this case. And circuit 21, FIG. 2a, becomes conditioned instead and sets Latch 22 through Or circuit 23. Control unit 1 then proceeds to perform a "Generate Abstract" operation. The logic pulse on Track Read line 9 causes a logic 1 pulse to propagate through a Generate Abstract shift register 30, comprising portions 30a, 30b, 30c and 30d in FIGS. 2a and 2b. Shift register 30 comprises bits B1 through B20 and controls the abstract generation process. Each stage of register 30 provides an output signal, when active, such as on line 35 for stage B1.

Figure 2B:
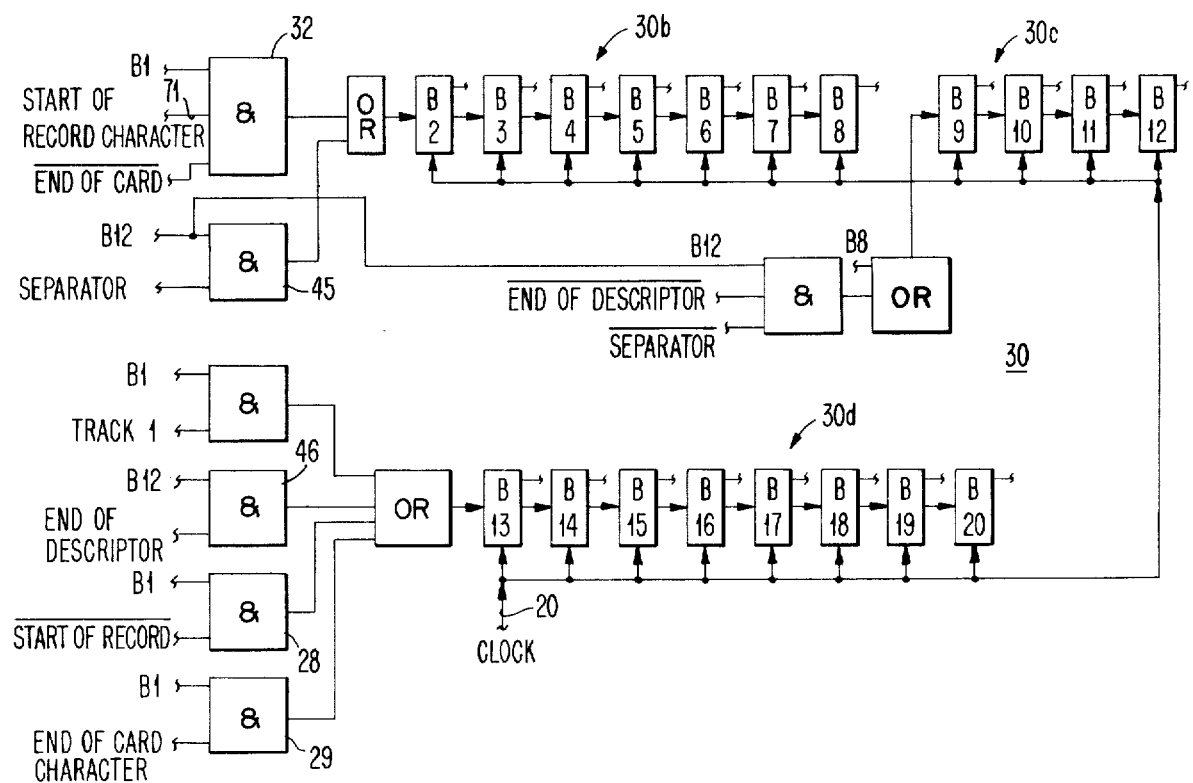

As indicated in FIG. 2b, the logic proceeds from state B1 to state B2 only if the first character of a record that is being analyzed is a Start of Record character, line 71 to And circuit 32.

Start of Record characters are recorded at the beginning of each field of information, beginning with track 2, and continuing through track 50. Such characters are always recorded at the beginning of a track, but since a field may comprise more than one track of information, start of Record characters are not necessarily found in all tracks where information is present, only those tracks where a field starts.

Figure 3A:
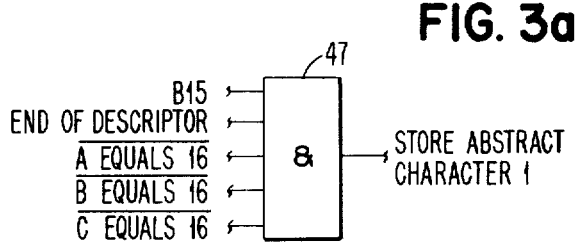
Figure 3B:
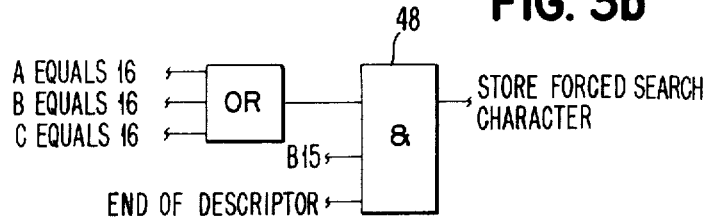
Figure 3C:
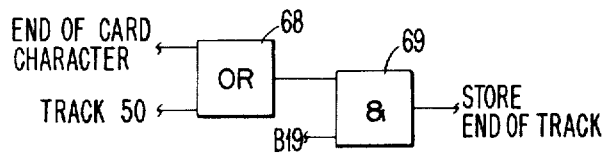
Figure 3D:
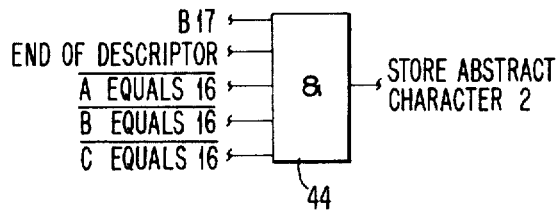
Figure 3E:
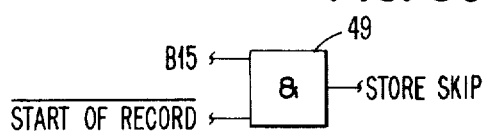
Figure 3F:
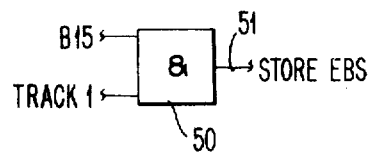
Figure 3G:
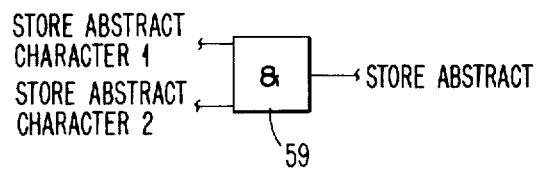

Since in the case being described, generate abstract shift register 30 is assumed to be energized as the result of reading a non-EBS character in track 1 shift register 30 will go from state B1 directly to state B13, FIG. 2b, instead of to B2. Register 30 then proceeds from state B13 in sequence to state B20 and in the process prepares an EBS character that becomes the first character of the new abstract that is going to be generated. During state B15, And circuit 50, FIG. 3f, provides an output on line 51. This in turn activates a code generating circuit 52, FIG. 3h, having various outputs such as RA11, RA12, etc., through RA17. The Store EBS signal on line 51 activates circuits 53, 54 and 55 to generate an EBS character. Other circuits RA13–RA16, not shown, may be activated as necessary. The EBS code on lines RA11–RA17 is applied to load the EBS character in the Record Abstract shift register 60, FIG. 3i. Register 60 comprises stages RA1–RA100. This shift register is controlled by the signals on line 61 labeled RA shift of, FIG. 3i. Upon a negative transition of the signal on line 61, the code represented by the signals RA11–RA17 input is stored in the RA1 section of the shift register desigated 56. Also, upon the negative transition of the signal RA Shift on line 61 the data contained in stage RA1 is transferred to stage RA2. Stage RA2 is transferred to stage RA3, etc. The conditions Track 1 and B15 to circuit 63 are sufficient to cause a logic pulse to be generated on RA Shift line 61.

Figure 2C:
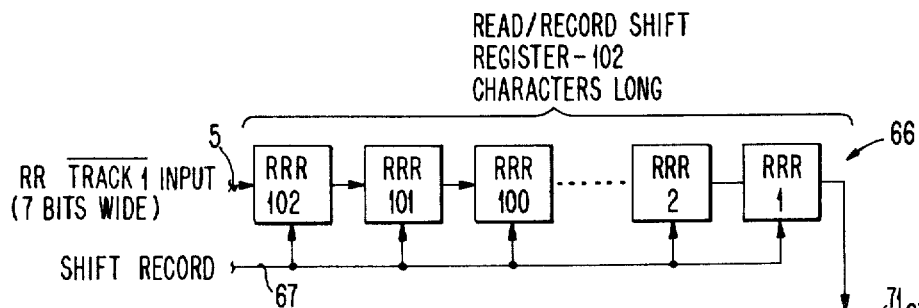
Figure 2D:
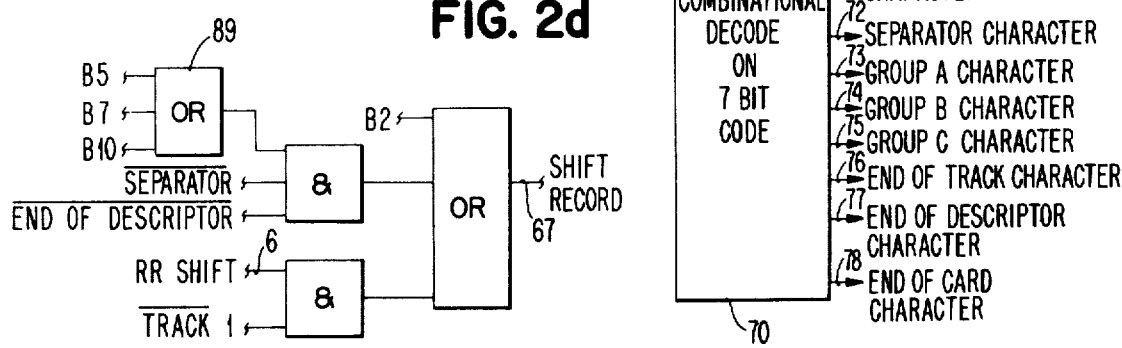
Figure 2E:
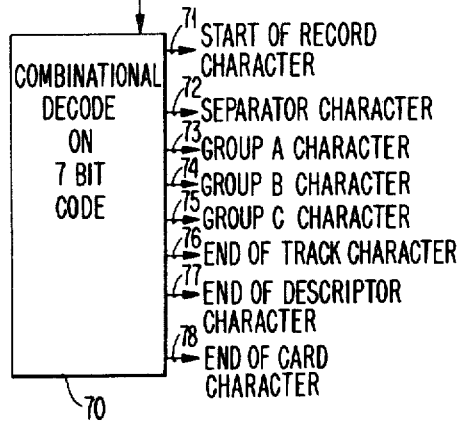
Figure 2E:
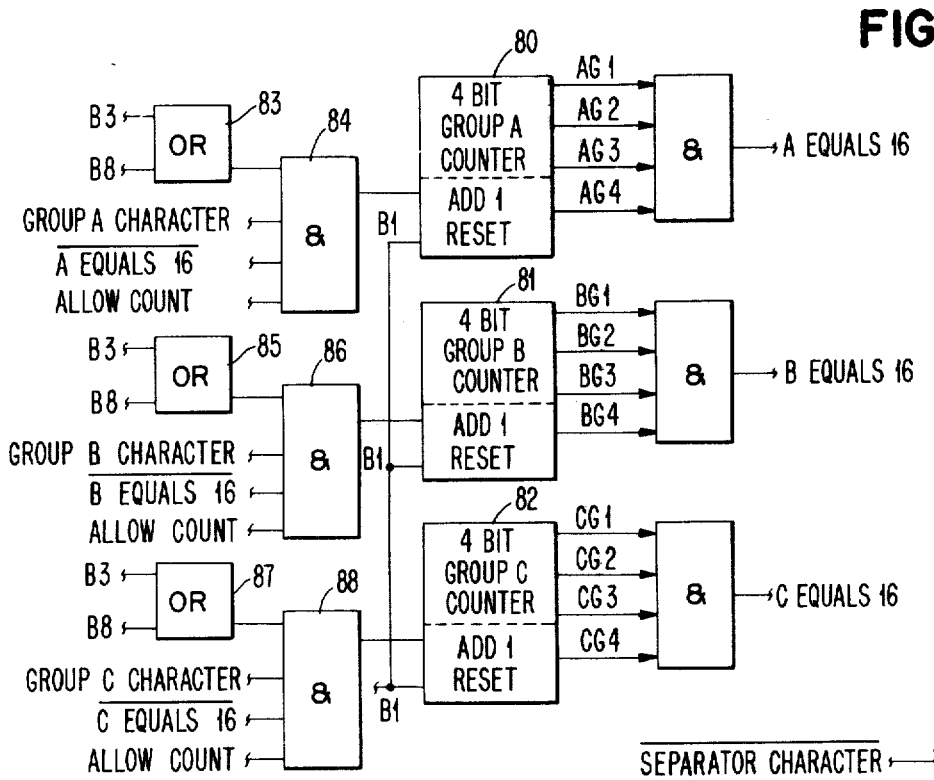
Figure 2F:
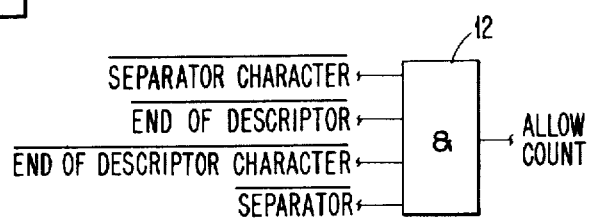
Figure 2G:
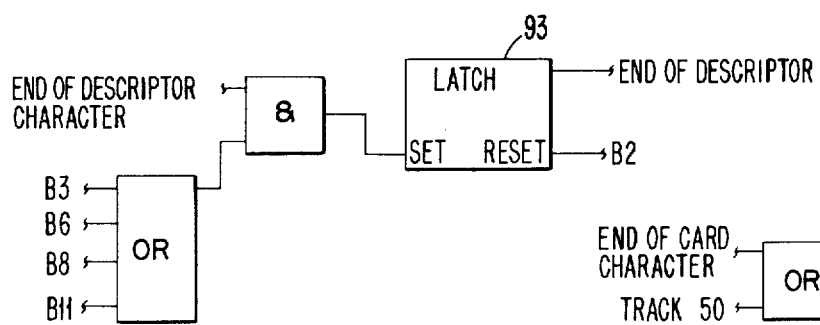
Figure 2J:
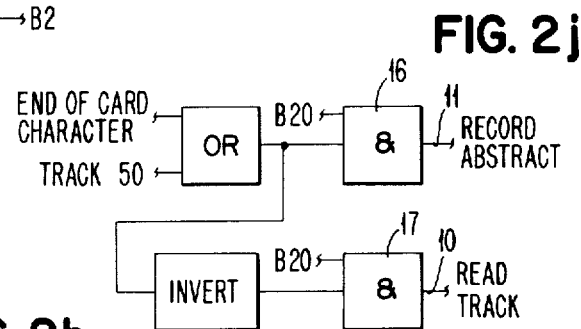

At time B20 the Read Track signal on line 10, FIGS. 1 and 2j, is activated by block 17. The signal on line 10 causes magnetic card reader/recorder 25 to read the next successive track on the magnetic card. The data contained in this next track is transferred to the Read/Record shift register designated 66, FIG. 2c. Transfer of data is effected by reader/recorder 25 controlling the interface signal called RR Track 1 input line 5, FIGS. 1 and 2c, and the signal RR Shift, line 6, FIGS. 1 and 2d. Read/Record shift register 66 is of the type in which the code represented by the interface signal RR Track 1 input will be stored in the section of the shift register labeled RRR102 when the Shift Record line 67 of FIG. 2c and 2d has a negative transition. A negative transition on the line 67 also causes data to propagate through Read/Record register 66. Reader/recorder 25 controls the shifting of register 66 during this action by controlling the interface signal on the RR Shift line 6, FIG. 2d. Magnetic card reader/recorder 25 controls the shifting of the Read/Record shift register 66 until the first character read from the track is located in section RRR1 of FIG. 2c. At this time, the interface signal Track Read, line 9 is again pulsed with a logical 1. This pulse again causes the Generate Abstract shift register 30 to be activated, this time by block 38 of FIG. 2a. Since the first character to be encountered in Read/Record shift register 66 will now be a Start of Record character, shift register 30, FIG. 2b, will proceed from state B1 to state B2, as a result of And circuit 32 becoming activated. Shift register 30 then proceeds from state B2 to state B8 and in the process generates the portion of the abstract which is contributed by the first word of the first record.

The abstract generation process proceeds as follows: During state B2, the contents of Read/Record shift register 66 of FIG. 2c, are shifted one position to the right as controlled by signal on line 67, FIG. 2d. This shift causes the first character of the first word of the first rcord to be contained in the section labeled RRR1 of FIG. 2c so that this character can be analyzed by the combinational decode block 70, FIG. 2c. Block 70 has output lines 71–78 provides unique 7-bit decoded outputs of a Start of Record character, a Separator character, an End of Track character, an End of Descriptor character and an End of Card character. In addition, it categorizes the remaining characters into one of three groups labeled A, B, and C which are approximately equal in probability of usage in the English language. In providing this categorization into groups A, B, and C, the combinational decode implements the allocation indicated by the code chart shown in FIG. 5. Thus, the current character being analyzed will drive one of the three output lines 73–75: Group A character, Group B character, or Group C character to a logical 1.

Figure 5:
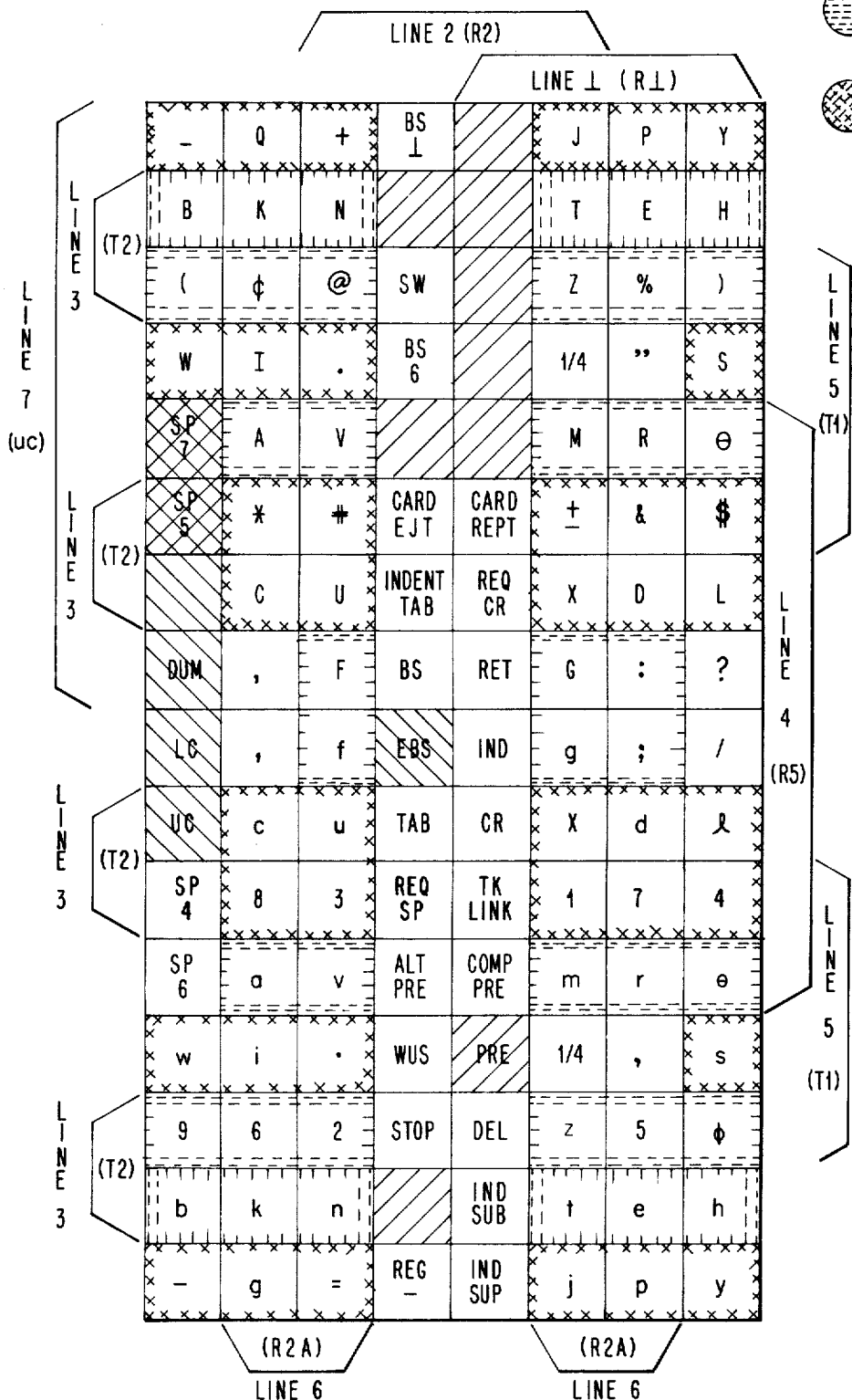
FIG. 5 is a code chart illustrating a typical probability of occurrence of characters in the English Language within predetermined abstract groups.
Figure 6A:
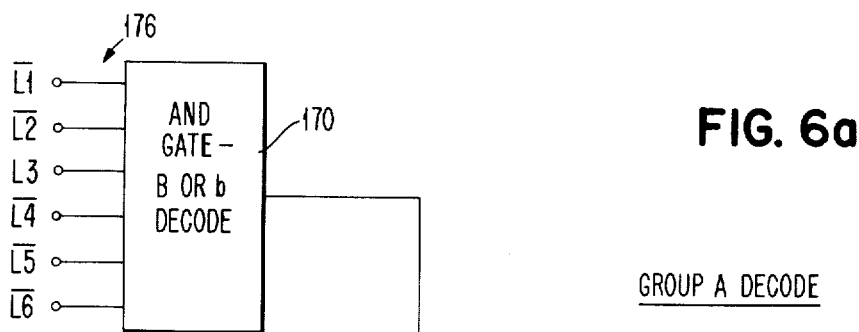
FIG. 6a illustrates a detailed logic implementation of Group A decode, one of several decode outputs shown in FIG. 2c, and in accordance with the table in FIG. 6b.
Figure 6B:
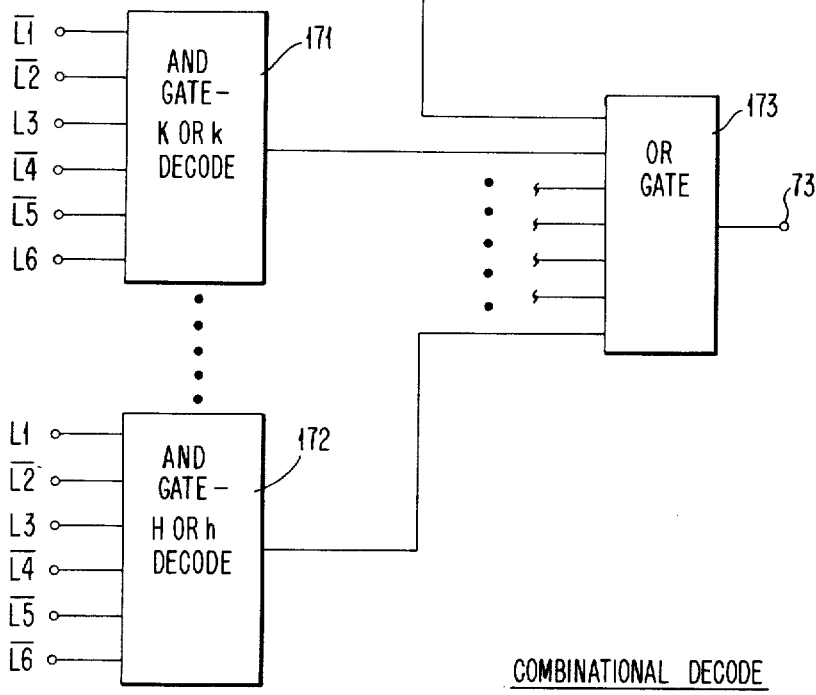

FIGS. 6a and 6b illustrate combinational logic that is useful with combinational decode block 70, FIG. 2c. The logic is based on the categorization of characters into groups A, B, and C, in accordance with the code chart of FIG. 5. The logic can be extended for all functions of the combinational decode block 70 but illustrates in particular the logic for categorizing characters into "Group A" with output on line 73, FIGS. 2c and 6a. The determination of the character "B" or "b" illustrates the principles. Line inputs, such as lines 1–6 in FIG. 5 are illustrated at 176 in FIG. 6a. The various conditions of the line inputs such as L1, Not L1, L2, Not L2, etc. are applied to blocks such as And circuits 170, 171, 172, etc. The outputs of And circuits 170, etc. are applied to Or circuit 173 for further output on line 73.

The status of the various lines L1, L2, etc. for the individual characters is illustrated in FIG. 6b. It is noted that seven lines designated L1–L7 are used uner some conditions with position L7 indicating whether the character is an upper or lower case character. Insofar as determining the categorization of each character, however, only lines L1–L6 need be utilized. Thus, a "B" is represented by L3 and L7 being up while the lower case "b" is represented by L3 up and L7 down. Referring again to FIG. 6a, since either the "B" or "b" is represented by L3 being up, whenever one of these two characters is present, And circuit 170 is activated. The output of And circuit 170, in turn, activates Or circuit 173 for an output from terminal 73 indicative that this is a Group A character. Other Group A characters are illustrated in FIG. 6b, such as "K" and "k" and the related And circuit shown in FIG. 6a, such as And circuit 171.

In this manner, the various characters ae categorized into one of the groups A, B, or C in accordance with the chart of FIG. 5. Also, other characters encountered such as the "Start of Record" character are identifiable on the other output lines 71, 72, and 74–78 in a comparable manner.

Figure 2H:
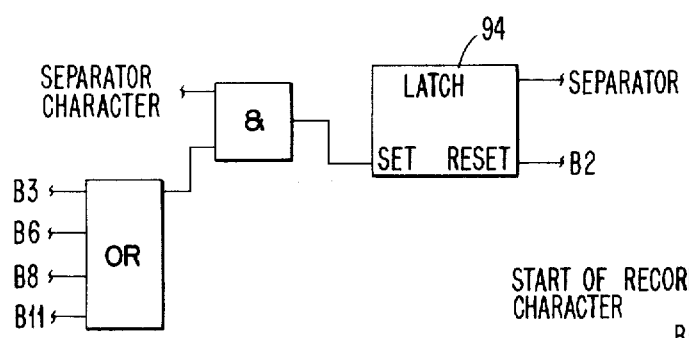

Blocks 80, 81,and 82 of FIG. 2e represent 4-bit counters that store the number of characters of each group that have been decoded. At time B3 of register 30, one of these 4-bit counters is incremented depending upon whether the character contained in storage element RRR1 in register 66, FIG. 2c is a Group A character, Group B character, or Group C character. This is done under control of blocks 83–84 for Group A, 85–86 for Group B, and 87–88 for Group C, FIG. 2e. During time B5, the contents of Read/Record shift register 66 is again shifted one position to the right so that the second character of the first word of the first record is now located in the storage element RRR1, as a result of the B5 input to Or circuit 89, FIG. 2d. During time B6, this character is analyzed not as to whether it belongs to Group A, B, or C but rather as to whether it is a Separator character or an End of Descriptor character. The advent of either one of these special characters is remembered by latches 93 and 94 in FIGS. 2g and 2h for later usage. During time B7, the contents of Read/Record shift register 66 are again shifted one position to the right so that the third character of the first word for the first record is located in storage element RRR1. During time B8, the 4-bit group counters labeled 80, 81, and 82 of FIG. 2e are again incremented according to whether this third character belongs to Group A, B, or C provided that neither a Separator character nor an End of Descriptor character has been encountered as the second or third character of the word being analyzed.

At this point in time, the contribution to the abstract of the first word of the first record has been calculated and is stored in the 4-bit counters labeled 80, 81, and 82 of FIG. 2e. Further, the control logic can be in one of two states. Either a Separator character or an End of Descriptor character has been encountered or neither of these characters have been encountered. If a Separator character has been encountered, And circuit 45, FIG. 2b is activated, and shift register 30 will proceed from state B8 through state B12 and eventually to state B2 to analyze the next word of the record. If neither a Separator character nor an End of Descriptor character have been encountered, register 30 will go from state B8 to state B9 and will repeatedly cycle from B9 to B12 until a Separator character or an End of Descriptor character is located. As indicated, the fact that either an End of Descriptor character or a Separator character has been located is stored in the appropriate latch 93 or 94 of FIGS. 2g or 2h during control time B11. Upon the subsequent finding of a Separator character, the shift register 30 will go to state B2 and proceed with analyzing the next word of the record. In the event of finding that an End of Descriptor character has been located whether in state B8 or state B12, register 30 will proceed to state B13 where the abstract just completed will be prepared for recording. A transfer from state B12 to state B13 is controlled by And circuit 46.

The End of Descriptor Character decode provided by block 70 of FIG. 2c will assure a true state for the following codes found in section RRR1 of FIG. 2c. (1) The Beginning of Primary Print Field codes; or (2) the Beginning of Auxiliary Print Field code; as presented in the example on Page 9; or the (3) End of Track code. No unique code is defined to signify the End of Descriptor Condition but the beginning of either print field or the occurrence of the last character of a track defines the End of Descriptor condition.

In summarizing the action described thus far, shift register 30 will repeatedly cycle through the states from B2 to B12 with the intelligence necessary to calculate the contribution to the abstract of each word of the first record. An End of Descriptor character will eventually be located. At that time, register 30 will proceed to state B13 in order that the abstract may be prepared for recording.

RECORDING OF ABSTRACT

Figure 2I:
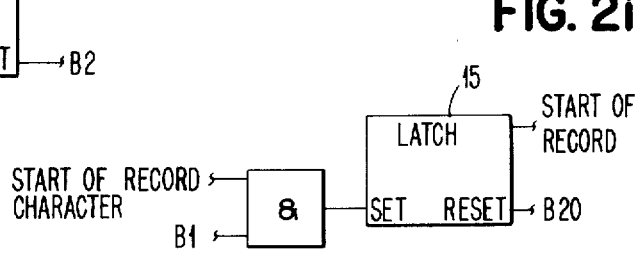
Figure 2K:
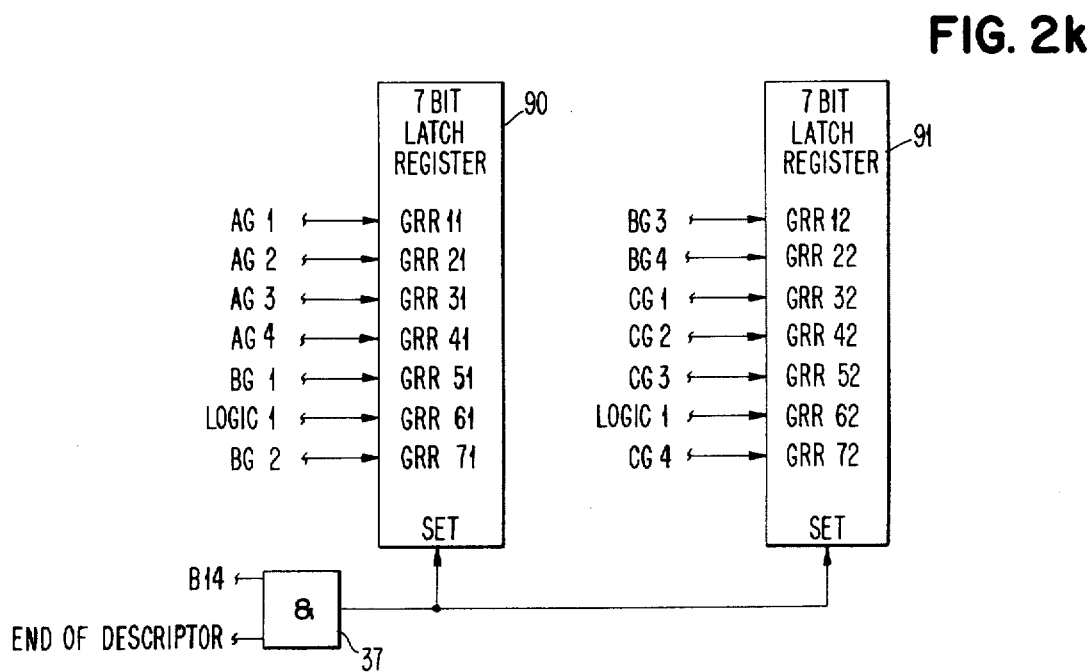

The process of preparing an abstract for recording is controlled by sequential movement of register 30 from state B13 in sequence to state B20. Related logic is shown primarily in FIGS. 3a through 3i. The first step in this operation occurs under control of logic in FIG. 2k during control time B14. Block 37 controls the action. At this time the information representing the abstract contained in counters 80, 81 and 82 of FIG. 2e is transferred to the seven-bit storage elements labeled blocks 90 and 91 of FIG. 2k. As indicated, the nature of this transfer is such that the four-bit quantities representing the number of group A characters, group B characters, and group C characters are transformed into two seven-bit characters which are suitable for recording in the magnetic card reader/recorder 25. This involves outputs AG1–AG4, BG1–BG4 and CG1–CG4, FIGS. 2e and 2k, in particular. The prime requiement here is that the sixth bit of each of the seven-bit characters to be recorded on the magnetic card must be a logic 1 so that the codes cannot be confused with special codes which are used to control the magnetic card unit mechanisms. During control time B15, one of the logic blocks 47, 48, 49 or 50 of FIGS. 3a, 3b, 3e, or 3f will be driven to a logical 1, depending upon what type of character is to be stored as a part of the abstract. Block 47, FIG. 3a, is driven to a logical 1 if neither of the four bit group counters 80–82 of FIG. 2c has equalled or exceeded 16 during the abstract generation process. If either of these four bit counters has equalled or exceeded 16 the capacity of the abstracting algorithm has been exceeded so that a Forced Search character would be recorded in the abstract rather than the actual abstract characters. This limitation of the number of characters of each group to 16 is not a limitation of the abstracting algorithm, but merely rather a limitation of the storage area available on track 1 of the magentic card in the illustrated case. Therefore, depending upon whether the output of block 47 of FIG. 3a or block 48 of FIG. 3b becomes a logical one, either the first character of the abstract or a Forced Search character will be recorded as a part of the abstract. The actual storage of either of these two characters is controlled by logic blocks in FIG. 3h, such as blocks 55, 57 and 58 in a manner similar to that when the EBS character was stored as previously described. The appropriate character, i.e., either the first abstract character or the Forced Search character, will be stored in the storage unit labeled RA1 of the Record Abstract shift register 60 FIG. 3i, just as in the case of storing the EBS character. Note that logic block 64 of FIG. 3i will generate an RA shift pulse at control time B15 (And circuits 65 or 62) to effect the storage. And circuit 62 is activated by the signal labeled store abstract, generated by block 59 of FIG. 3g, which is at a logical one when either of the two abstract characters are being stored. Logic block 44 of FIG. 3d indicates that the second and last character of the abstract is stored during control time B17 in a manner similar to the storing of previous characters. By the time that state B20 is reached in register 30, FIG. 2b, the abstract characters or a Forced Search character has been appropriately stored. At this time, the Read Track signal generated by block 17 of FIg. 2j will again be activated. This will cause still another track to be read from the magnetic card and the process just described will continue until one of a set of special conditions occurs.

NOT START OF RECORD CHARACTER

One of the special conditions that occur is that when the first character of a track is not a Start of Record character. This is indicative of the fact that a record extends over more than one track of the magnetic card. In this case, the generate abstract shift register 30 of FIG. 2a and 2b will proceed from state B1 to B13 under the control of latch 15 of FIG. 2i and And circuit 28, FIG. 2b. Logic block 49 of FIG. 3c indicates that for the case beng described currently a Skip character will be stored away at the control time B15 as other characters have been previously stored away. Again, a new track from the magnetic card will be read when the shift register 30 reaches state B20 and the cycles thus described will repeat themselves appropriately. The special Skip character just d ribed is used to maintain a special orientation between the location of a record on a magnetic card and the location of its particular abstract in the abstract storage area.

END OF CARD OR COMPLETION OF ABSTRACT

Another special action which is taken is initiated by either seeing an End of Card character as the first character of a record or upon the completion of the generation of the abstract characters for a record which is located in track 50 of the card. In either of these cases the appropriate action is to store an End of Track character in the Record Abstract shift register 60, FIG. 3i in a manner similar to the storing of previous characters. The control of the storage of an End of Track character is accomplished by logic blocks 68 and 69 of FIG. 3c. Note that in the case of an End of Card character being the first character of a record the Generate Abstract control shift register 30 of FIGS. 2a and 2b will proceed from state B1 to state B13 under control of And circuit 29 so that the storing of the End of Track character can be eventually accomplished at time B19 from block 69, FIG. 3c. In the case where the record is located in track 50, the last track of the magnetic card, the Generate Abstract control shift register 30, FIGS. 2a and 2b, will proceed with intelligence to the states B2 through B12 to generate the appropriate abstract before proceeding to state B13 where the abstract and the End of Track character are subsequently stored in the Record Abstract shift register 60, FIG. 3i. The occurrence of either one of these last two special conditions indicates that the generation of the abstract for this particular card has been completed. Consequently, at control time B20 the record abstract interface lead 11 will be driven with a logical 1 pulse by block 16 of FIG. 2j. The pulsing of this interface lead causes the magnetic card reader/recorder 25 to take the abstract out of Record Abstract shift register 60 and to record such abstract in track 1 of the card containing the records from which the abstract was generated. This transfer of information is accomplished by appropriate control of the interface lead 13 RR Abstract Out and lead 6 RR Shift indicated in FIG. 1. Note that the shifting of the Record Abstract shift register is controlled by the RR shift signal via logic block 64 of FIG. 3i. When the recording of the abstract in track 1 has been completed the magnetic card reader/recorder will feed a new card and the process described thus far will repeat, as appropriate.

TEST ABSTRACT OPERATION

Figure 4B:
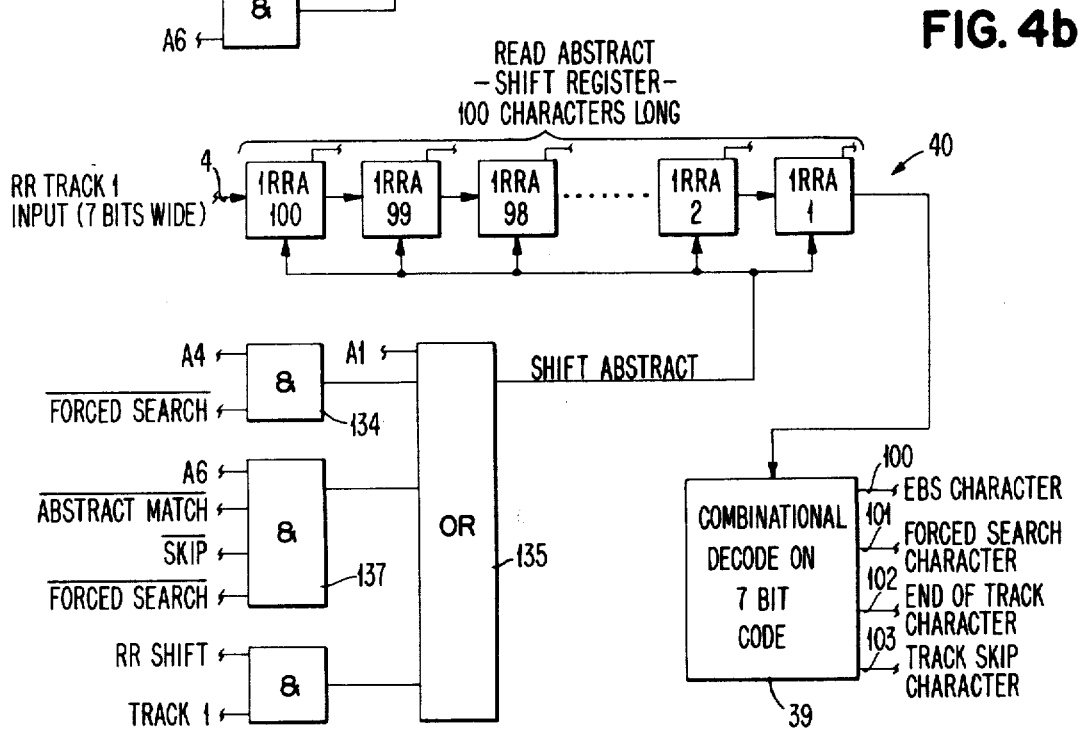
Figure 4C:
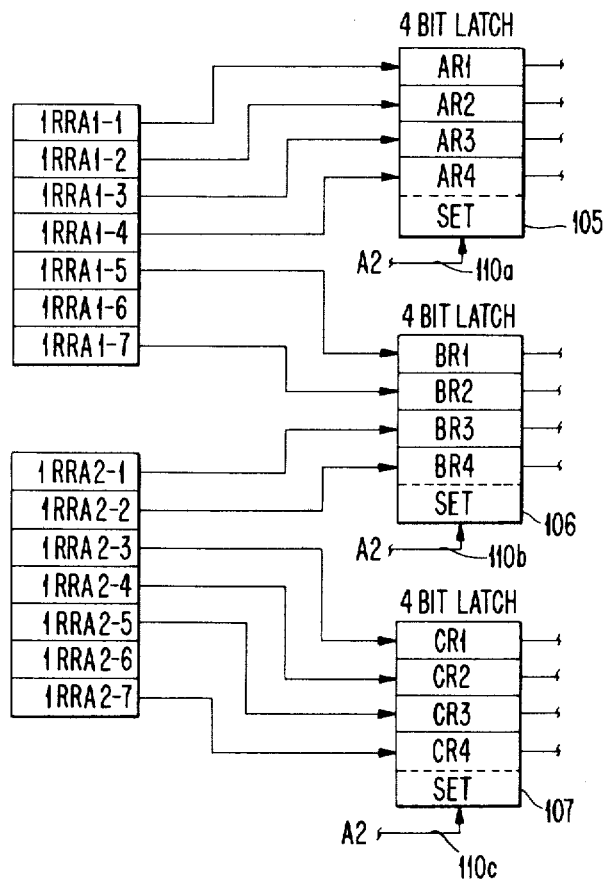

In the event that an EBS character is encountered as the first character of the first track, the control unit logic proceeds to do a Test Abstract operation instead of to the Generate Abstract operation previously described. The fact that an EBS character is present indicates that a valid abstract is located in track one of the card just read. Control for entering the Test Abstract mode is done via blocks 41–43, FIG. 4a. FIG. 4a includes a Test Abstract shift register 98. The Test Abstract process is activated by causing a logical one pulse to enter shift register 98 at element A1, thereafter to propagate sequentially from A1 to A7. At this point in time, the abstract that had been contained in track 1 of the magnetic card has already been transferred to the Read Abstract shift register 40 of FIG. 4b in such a manner that the first character is located in 7-bit storage element 1 RRA1. Block 39 of FIG. 4b is a combinational decode on 7-bits that provides the detection of special characters for controlling the Test Abstract process, lines 100–103. During control time A1, the contents of the Read Abstract shift register 40, FIG. 4b, are shifted one position to the right so that the second and third characters of the abstract are present in character storage element 1 RRA1 and 1 RRA2, positions 1 through 7. These two characters are the abstract for the first record of the magnetic card currently being analyzed. FIG. 4c indicates that at control time A2, the contents of storage element 1 RRA1 and 1 RRA2 are transferred to three four-bit latch registers 105–107 by a signal on lines 110a, b, c. After this transfer has taken place these four-bit latch registers will contain the number of group A characters, group B characters, and group C characters comprising the abstract for the record beng analyzed. This information is subsequently used in FIG. 4e as input to the algorithm which determines whether the abstract of the record being analyzed matches the abstract of the inquiry. In FIG. 4e the terms AR1 through AR4, BR1 through BR4, and CR1 through CR4 represent the number of characters by group for the record being analyzed and are generated by the logic including latches 105, 106 and 107 in FIG. 4c. In FIG. 4e, the four-bit latch registers labeled blocks 120, 121, and 122 contain the abstract information which represents the abstract of an inquiry. That is, block 120 of FIG. 4c contains the number of characters in the inquiry that have fallen into group A. Likewise, block 121 of FIG. 4e contains the number of group B characters in the inquiry, and block 122 contains the number of group C characters in the inquiry. This information is generated when the search operation was initially begun by depressing the Start Search button and is stored in blocks 120, 121, and 122 of FIG. 4e for later usage. The algorithm for generating the abstract of the inquiry is identical to the algorithm used for generating the abstract of a record. The logic for generating the abstract of the inquiry is similar to the logic required to generate the abstract of a record which is shown in FIGS. 2a through 2i. Since the logic for generating the abstract of the inquiry and that for generating the abstract of the record are similar, the logic for generating the inquiry abstract is not shown. Logic blocks labeled 124, 125 and 126 of FIG. 4e are combinational comparison logic whose outputs are a logical 1 when the number of characters in a particular group for the inquiry are less than or equal to the number of characters in that particular group obtained from the magnetic card. For example, the output of logic block 124 of FIG. 4e is a 1 when the number of group A characters in the inquiry are less than or equal to the number of group A characters in the record, and so forth for the groups B and C characters as generated by blocks 125 and 126. And circuit 130 of FIG. 4e completes the algorithm which determines whether a record abstract matches an inquiry abstract by generating a term which is a logical 1 only if the inquiry A characters are less than or equal to the record A characters and the inquiry B characters are less than or equal to the record B characters and the inquiry C characters are less than or equal to the record C characters. The output of block 130 is used at a later time to determine whether the record whose abstract has just been analyzed is a candidate for a detailed search operation.

At control time A3, a quantity 1 is added to the track counter register 131 indicated in FIG. 4f. This register is used to remember the track location on the magnetic card of the particular record whose abstract is being analyzed at any particular time. This register is reset at the beginning of the analysis of a new card by And circuit 132 and consequently, will always remember the location of the record whose abstract was last analyzed throughout the complete analysis of a particular magnetic card.

Referring back to FIG. 4b, at control time A4 the contents of the Read Abstract shift register 40 will be shifted one position to the right provided that a special condition called a Forced Search has not been met at And circuit 134. Logic block 135 of FIG. 4b will cause the contents of the Read Abstract shift register 40 to be shifted again to the right one position at control time A6 provided that none of the special conditions of an Abstract Match, a Skip or a Forced Search have occurred at And circuit 137. The special conditions just mentioned will be described in more detail subsequently. The shifting of the contents of the Read Abstract shift register 40 to the right during control times A4 and A6 is necessary to condition the logic to begin the analysis of the next two characters located in the abstract which represent the abstract of the next record stored on the magnetic card. The eventual disposition of the Test Abstract process is determined during control times A6 and A7. This is accomplished in part by control of latch 42 of FIG. 4a. As indicated there, this latch is reset at control time A6 if an Abstract Match has been found, if an End of Abstract has been located, or a Forced Search condition has been located. See blocks 140–142. The resetting of latch 42 indicates that there is a need to depart from the Test Abstract logic to perform some process other than testing the abstract. In the case of an Abstract Match, or the location of a Forced Search condition, the operation that next needs to be performed is a detailed search on the record whose abstract has matched the inquiry abstract or the record whose abstract is a Forced Search character. The logic which initiates the Detail Search operation is indicated in FIG. 4h, blocks 144–146.

DETAIL SEARCH

During a Detail Search operation the Detail Search logic will locate the track which is indicated by the track counter 131 shown in FIG. 4f and will compare the inquiry, word for word, with the record located in that track. If the inquiry matches that record, the information contained in that record will be printed on printer 27, FIG. 1, indicating a match between the inquiry and that particular record. If the inquiry does not match the record beng analyzed, the Detail Search logic will reactivate the Test Abstract logic by causing a logical one pulse on End Detail Search line 150 of FIG. 4a. From this point, the Test Abstract operation will begin again from the point at which it was previously terminated to perform the Detail Search operation. If in the process of performing a Detail Search, a match between the inquiry and the record is found, the Detail Search logic will, in that condition, also reactivate the Test Abstract logic by placing a logic one pulse on the End Detail Search line 150. This is done to allow multiple record matches to a particular inquiry.

Figure 4D:
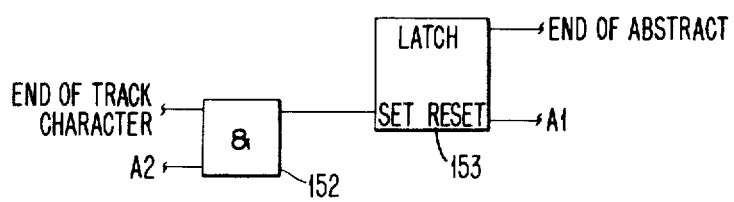

The portion of the Test Abstract process described thus far will continually repeat itself until an End of Abstract is located. An End of Abstract is designated by an End of Track character located in the abstract. FIG. 4d indicates that the presence of an End of Track character is determined by block 152 during control time A2. The output of block 152 sets latch 153, FIG. 4d, so that it can be remembered that the logic should perform an End of Abstract operation. Terminating the Test Abstract operation is begun by resetting latch 42, FIG. 4a during control time A6 from block 141. This prohibits the continuation of the Test Abstract operation. The Test Abstract process is terminated by logic block 160, FIG. 4g, during control time A7 when the interface line 12, Read New Card is activated. The magnetic card reader/recorder 25 then reads the next card in sequence in the magnetic card set. When the first track of the next card has been completely read and transferred to the Read Abstract shift register 40 of FIG. 4b, the card analysis operation that has been described to this point will begin again. That is, either a Test Abstract operation or a Generate Abstract operation will be performed for the next card, depending on whether an EBS character is found as the first character of the abstract.

FORCED SEARCH

There are two special conditions that can occur during a test abstract operation which have not been described thus far. The first is a Forced Search indication that requires that a Detail Search of the record to be done regardless of the analysis of the abstract comparison algorithm, FIG. 4e. The Force Search condition is indicated by the location of a Forced Search character in the abstract. A Forced Search character is used as the representation of the abstract for a record which has exceeded the abstracting algorithm capacity as explained previously in describing the Generate Abstract operation. FIG. 4i indicates that during control time A2 the presence of a Forced Search character is determined by And circuit 162 and this fact is used to set latch 163 so that this condition may be remembered for subsequent control of the Test Abstract logic. As briefly described earlier, a Forced Search condition will cause the resetting of latch 42, FIG. 4a during control time A6 from And circuit 142 causing the Test Abstract operation to be terminated. During control time A7, a Detail Search operation begins on the appropriate record.

SKIP

The second special condition that can be incurred during a Test Abstract operation is the Skip condition. As indicated in FIG. 4j, the Skip condition is initiated by the recognition of a Track Skip character in the abstract. The determination of such a character at control time A2 activates And circuit 165 to set latch 166 set so that the Skip condition can be remembered to effect subsequent control of the Test Abstract logic. The Track Skip character is used in the abstract to maintain a spatial orientation between the location of a record on a card and the location of the abstract for that record in the abstract tract when records are allowed to occupy more than one track. When a Skip condition is encountered the only positive action to be taken by the Test Abstract logic is to advance track counter 131, FIG. 4f, by one unit during control time A3. In addition, the shifting of the contents of the Read Abstract shift register 40 one position to the right is prohibited during control time A6 when a Skip condition has been encountered by degating block 137, FIG. 4b. The searching of the remainder of the magnetic cards comprising the magnetic card set is accomplished by intelligently switching between the Test Abstract logic, the Generate Abstract logic, the Record Abstract logic, and the Detail Search logic in the manner that has been described thus far. This process will repeat itself until all of the cards in the magnetic card set have had their abstracts compared to the abstract of the inquiry and detail searches completed as appropriate depending upon the outcome of this comparison. When all of the magnetic cards have thus been searched, the index search operation has been completed and any records that have matched the inquiry will have been printed out on the printer. It should be noted here that when it is required to generate an abstract for a particular card the comparison of the inquiry to the information contained on that card can be done in one of two ways. The first is that a Detail Search can be performed on every record simultaneously with the process of generating the abstract for that card. The second means of comparing the inquiry to the records contained on the card for which an abstract is being generated is to perform the abstract generation without doing a Detail Search followed by a normal Test Abstract operation once the Generate Abstract operation has been completed.

An important aspect of the present invention is that the abstracting techniques enable high speed searching of a multitude of record storage members in an efficient manner due to the fact that only a small portion of each record medium need be checked, such portion storing the abstract for the information contained elsewhere in the record. Thus, a large file can be checked for information that matches an inquiry without going through all of the information contained in the file in its entirety. Basing the abstracting scheme on probability distribution of characters enables the establishment of abstracts comprised of groups of values indicative of the information contained in the records, with the distribution criteria leading to the development of abstract groups that are predicated on a more balanced distribution and that ultimately result in fewer members of records involved in detailed search.

While the invention has been particularly shown and described with reference to a preferred embodiment, it will be interested by those skilled in the art that various changes in form and detail may be made without departing from the spirit and scope of the invention.

What is claimed is:

1. Apparatus for generating at least one abstract that is useful during information searching and retrieval procedures, comprising:
   1. means for sensing information comprising individual words in a selected language, each word comprising one or more individual characters;
   2. means for categorizing selected ones only of the characters in said words into predefined character groups that are based on a probability distribution of characters in the language selected;
   3. means maintaining a count of the number of characters categorized into each of said predefined character groups; and
   4. means for storing said count as an abstract of said information.
2. The apparatus of claim 1 further comprising:
   5. means for providing an inquiry word of information comprising at least an individual inquiry word in a selected language said word comprising one or more individual characters;
   6. means for categorizing selected ones only of the characters in said inquiry word into predefined character groups that are based on a probability distribution of characters in the language selected;
   7. count maintaining means for maintaining a count of the number of characters in said inquiry word categorized into each of said predefined character groups;
   8. means for comparing said inquiry count with said abstract count; and
   9. means providing an indication of a match or mismatch of said abstract and inquiry counts.
3. The apparatus of claim 1 wherein said count maintaining means has a limited count capacity of sufficient size for counting an average number of characters in each character group, and further comprising:
   5. recognizing means for recognizing when the character count for any predefined character group exceeds said limited count capacity; and
   6. force search means controlled by said recognizing means for generating and recording a force search indication rather than an abstract in order to signify that a search of the related information is required.
4. The apparatus of claim 1 further comprising:
   5. means for generating and recording an abstract control indication to signify the storage of one or more abstracts for use in determining whether an abstract search or a detailed search of the information is necessary.

5. The apparatus of claim 1 wherein said words of information are stored in storage areas in groups designated index groups, each index group normally occupying a predetermined area of storage but occasionally exceeding said predetermined area, and further comprising:
   5. means for determining when an index group exceeds said predetermined area of storage; and
   6. means for recording an area skip code for areas storing the excess of information in any index group.

6. The apparatus of claim 1 further comprising:
   5. means for categorizing the selected characters into said character groups based on the physical location of characters in their related words, such as first and third character locations of each word.

7. Apparatus for generating at least one abstract that is useful during information searching and retrieval procedures, comprising:
   1. means for sensing an inquiry of information comprising at least an individual inquiry word in a selected language, said inquiry word comprising one or more individual characters;
   2. means for categorizing selected ones only of the characters in said inquiry word into predefined character groups that are based on a probability distribution of characters in the language selected,
   3. means for maintaining a count of the number of characters categorized into each of said predefined character groups; and
   4. means for utilizing said count as an inquiry during searching of said information.

8. Apparatus for generating at least one abstract that is useful during information searching and retrieval procedures, comprising:
   1. means for sensing information comprising individual words in a selected language, each word comprising one or more individual characters;
   2. means for categorizing selected ones only of the characters in said words into predefined character groups that are based on a probability distribution of characters in the language selected;
   3. means for maintaining a count of the number of characters categorized into each of said predefined character groups;
   4. means for converting said count to a compressed apparatus-compatible abstract code form;
   5. and means for storing said compressed abstract code as an abstract of said information.

9. The apparatus of claim 8 further comprising:
   6. means for providing an inquiry of information comprising at least an individual inquiry word in a selected language said word comprising one or more individual characters;
   7. means for categorizing selected ones only of characters in said inquiry into predefined character groups that are based on a probability distribution of characters in the language selected;
   8. means for maintaining a count of the number of characters in said inquiry categorized into each of said predefined character groups;
   9. means for reconverting said abstract count from compressed form to a character group count form like said inquiry count;
   10. means for comparing said inquiry count with said abstract count; and
   11. means providing an indication of a match or mismatch of said abstract and inquiry counts.

10. The apparatus of claim 8 wherein each abstract count comprises three non-compatible count characters, and further comprising:
   6. means in said converting means for compressing each abstract count into two apparatus - compatible characters.

11. The apparatus of claim 10 further comprising:
   6. means for generating and recording a special mark in each apparatus-compatible character to signify that it represents an abstract.

12. Apparatus for searching and retrieving information wherein said information is stored on a record medium in index groups each having index words representative of original documents and wherein a separate area is allotted for storage of abstracts, and an abstract count is stored for each said index group, said abstract count being based on individual characters categorized into predefined character groups based on a probability distributiion of said characters in a selected language; said apparatus comprising:
   1. means for sensing said stored abstract counts from said record medium;
   2. means for comparing an inquiry count with said sensed abstract counts; and
   3. means for providing an indication of a match or mismatch of said abstract and inquiry counts.

13. The apparatus of claim 12 wherein each index group is recorded in an individual storage area and wherein a particular storage area is set aside for storage of abstracts, and further comprising:
   4. means for locating each index storage area for accessing of the index stored therein;
   5. means for locating said particular storage area; and
   6. means for sensing each abstract in said particular storage area.

14. The apparatus of claim 12 wherein a force search indication is recorded in place of any abstract count that exceeds a predetermined number higher than an average number of characters in each character group, and further comprising:
   4. means for recognizing said force search indication; and
   5. means controlled by said recognizing means for searching the entire related index group for comparison with said inquiry.

15. Apparatus for generating at least one abstract that is useful during searching and retrieval procedures involving information stored on a record medium comprising:
   1. means for sensing information comprising individual words in a selected language stored on said record medium, each word comprising one or more individual characters;
   2. means for categorizing selected ones only of the characters in said words into predefined character groups that are based on a probability distribution of characters in the language selected;
   3. means maintaining a count of the number of characters categorized groups; and
   4. means for storing said count on said record medium as an abstract of said information.

16. The apparatus of claim 15, further comprising:
   5. means for categorizing individual characters into said character groups based on the physical location of said characters in their related words, such as first and third character locations of each word.

17. The apparatus of claim 15 wherein said count maintaining means has count capacity of sufficient size for counting an average number of characters in each character group, and further comprising:

means for recognizing when the character count for any predefined character group exceeds said limited count capacity; and means controlled by said recognizing means for generating and recording a force search indication rather than an abstract in order to signify that a search of the related information is required.

18. The apparatus of claim 15 further comprising:

means for generating and recording an abstract control indication to signify the storage of one or more abstracts for use in determining whether an abstract search or a detailed search of the information is necessary.

19. The apparatus of claim 15 wherein said words of information are stored in storage areas in groups designated index groups, each index group normally occupying a predetermined area of storage but occasionally exceeding said predetermined area, and further comprising:

means for determining when an index group exceeds said predetermined area of storage; and means for recording an area skip code for areas storing the excess of information in any index group.

20. The apparatus of claim 15 further comprising:

5. means for providing an inquiry word of information comprising at least an individual word in a selected language said word comprising one or more individual characters;

6. means for categorizing selected ones of said characters in said inquiry word into predefined character groups that are based on a probability distribution of characters in the language selected;

7. means for maintaining a count of the number of characters in said inquiry word categorized into each of said predefined character groups;

8. means for sensing said abstract count stored on said record medium;

9. means for comparing said inquiry count with said sensed abstract count; and 10. means providing an indication of a match or mismatch of said abstract and inquiry counts.

21. The apparatus of claim 20 further comprising:

means responsive to a match of said inquiry count and a said abstract count for manifesting the related information, as by printing said related information on a document.

22. The apparatus of claim 15 wherein information is stored on said record medium in index groups, each having index words representative of original documents and wherein a separate area is allotted on said medium for storage of abstracts and further comprising:

means for accessing each index group on said record medium in order to categorize characters;

means operable to maintain an abstract count for each index group;

and means for recording each said abstract count in said allotted area on said record medium.

23. The apparatus of claim 22 wherein said record medium has a plurality of storage tracks thereon with each index group being recorded in an individual one of said storage tracks and wherein a particular track is set aside as said allotted area, and further comprising:

means for positioning each track on said record medium for accessing of the index stored therein;

means for positioning said particular track; and means for recording each abstract in said particular track.

24. The apparatus of claim 23 wherein said record medium is a magnetic record medium and further comprising:

means for recording information on said medium by magnetic patterns.

25. The apparatus of claim 23 wherein each index group normally occupies one storage track but occasionally exceeds one track and further comprising:

means for determining when an index group exceeds one track of storage; and means for recording a track skip code for tracks storing the excess of information in any index group.

26. Apparatus for searching and retrieving information stored on a record medium wherein said information is stored on said record medium in index groups, each having index words representative of original documents and wherein a separate area is allotted on said medium for storage of abstracts, and said record medium storing an abstract count for each said index group, said abstract count being based on individual characters in an index group that comply with predefined character groups based on a probability distribution of said characters in a selected language; said apparatus comprising:

1. means for sensing said abstract count stored on said record medium;

2. means for comparing an inquiry count with said sensed abstract count; and 3. means providing an indication of a match or mismatch of said abstract and inquiry counts.

27. The apparatus of claim 26 further comprising:

means responsive to a match of said inquiry count and a said abstract count for manifesting the related information, as by printing said related information on a document.

28. The apparatus of claim 26 wherein said record medium has a plurality of storage tracks thereon with each index group being recorded in an individual one of said storage tracks and wherein a particular track is set aside as said allotted area, and further comprising:

means for positioning each track on said record medium for accessing of the index stored therein;

means for positioning said particular track, and means for sensing each abstract in said particular track.

29. The apparatus of claim 26 wherein said record medium is a magnetic record medium and further comprising:

means for sensing information on said medium by detection of patterns on said medium.

30. The apparatus of claim 26 wherein index groups may exceed the capacity of an area and wherein areas storing excess information are designated by an area skip indication in place of an abstract count, and further comprising:

means responsive to an area skip indication for skipping to the next abstract count during any searching and comparing of said abstract counts with said inquiry count.

31. A method for generating in an information processing machine at least one abstract that is useful during information searching and retrieval procedures, comprising:
1. sensing by said machine information signals representative of information comprising individual words in a selected language, each word comprising one of more individual character;
2. developing in said machine, signals representative of characters in said system;
3. categorizing in said machine, selected ones only of the individual character signals into predefined character groups that are based on a probability distribution of the characters represented by said signals in the language selected;
4. maintaining an abstract count by said machine of the number of character signals categorized into each of said predefined character groups; and
5. storing said abstract count in said machine as an abstract of said information.

32. The method of Claim 31 further comprising:
6. sensing by said machine information inquiry signals representative of an inquiry of information comprising at least an individual inquiry word in a selected language, said word comprising one or more individual inquiry characters;
7. developing in said machine character inquiry signals representative of said at least an individual inquiry character;
8. categorizing in said machine selected ones only of the individual character inquiry signals into predefined character groups that are based on a probability distribution of the characters represented by said signals in the language selected;
9. maintaining in said machine an inquiry count of the number of character inquiry signals categorized into each of said predefined character groups;
10. comparing in said machine said inquiry count with said abstract count; and
11. providing from said machine indication signals representative of a match or mismatch or said abstract and inquiry counts.

33. The method of claim 32 further comprising:
12. manifesting in said machine the related information, as by printing said related information on a document, responsive to a match of said inquiry count and said abstract count.

34. The method of claim 31 further comprising:
6. generating and recording in said machine an abstract control indication to signify the storage of one or more abstracts for use in determining whether an abstract search or a detailed search of the information is necessary.

35. The method of claim 31 wherein said words of information are stored in storage areas in groups designated index groups, each index group normally occupying a predetermined area of storage but occasionally exceeding said predetermined area, and further comprising:
6. determining in said machine when an index group exceeds said predetermined area of storage; and
7. recording in said machine an area skip code for areas storing the excess of information in any index group.

36. The method of claim 31 where step (3) further comprises:
3a. categorizing in said machine the selected character signals into said character groups based on the physical location of the related characters, such as first and third character locations of each word.

37. The method of claim 31 wherein said machine includes counters, each having a count capacity of sufficient size for counting an average number of character signals in each character group, and further comprising:
6. recognizing in said machine when the character count for any predefined character group exceeds said count capacity, and
7. generating and recording in said machine a force search indication rather than an abstract when count capacity is exceeded in order to signify that a search of the related information is required.

38. The method of claim 37, further comprising:
8. recognizing in said machine said force search indication; and
9. searching in said machine for the related information.

39. The method of claim 31 further comprising:
6. developing in said machine abstract count signals from said abstract count, and
7. transferring by said machine information signals and abstract count signals between said machine and a record medium.

40. The method of claim 39 wherein said information is stored on said record medium in index groups each having index words representative of original documents and wherein a particular storage area is allotted for storage of abstracts, and an abstract count is stored for each said index group, said abstract count being based on individual characters categorized into predefined character groups based on a probability distribution of said characters in a selected language, and further comprising:
8. locating in said machine each index storage area for accessing of the index group stored therein;
9. locating in said machine said particular storage area; and
10. sensing in said machine each abstract count in said particular storage area.

41. The method of claim 39 wherein said record medium has a plurality of storage tracks thereon with each index group being recorded in an individual one of said storage tracks and wherein a particular track is set aside as said allotted area, and further comprising:
8. positioning in said machine each track on said record medium for accessing of the index stored therein;
9. positioning in said machine said particular track; and
10. recording in said machine each abstract in said particular track.

42. The method of claim 41 wherein said record medium is a magnetic record medium and further comprising:
11. recording in said machine information on said medium by magnetic patterns.

43. The method of claim 41 wherein each index group normally occupies one storage track but occasionally exceeds one track and further comprising:
11. determining in said machine when an index group on said record medium exceeds one track of storage; and
12. recording on said record medium in said machine a track skip code for tracks storing the excess of information in any index group.

44. A method for searching and retrieving in an information processing machine, information stored on a record medium in response to an inquiry represented by an inquiry count wherein said information is stored on said record medium in index groups, each having index words representative of original documents and wherein a separate area is allotted on said medium for storage of abstracts, and said record medium storing an abstract count for each said index group, said abstract count being based on individual characters in an index group that comply with predefined character groups based on a probability distribution of said characters in a selected language; said apparatus comprising:
  1. sensing in said machine an abstract count stored on said record medium;
  2. comparing in said machine said inquiry count with a sensed abstract count; and
  3. providing from said machine an indication of a match or mismatch of said abstract and inquiry counts.

45. The method of claim 44 further comprising:
  4. manifesting in said machine the related information, as by printing said related information on a document, responsive to a match of said inquiry count and a said abstract count.

46. The method of claim 44 wherein said record medium has a plurality of storage tracks thereon with each index group being recorded in an individual one of said storage tracks and wherein a particular track is set aside as said allotted area, and further comprising:
  4. positioning in said machine each track on said record medium for accessing of the index stored therein;
  5. positioning in said machine said particular track, and
  6. sensing in said machine each abstract in said particular track.

47. The method of claim 44 wherein said record medium is a magnetic record medium and further comprising:
  4. sensing in said machine information on said medium by detection of magnetic patterns on said medium.

48. A method for generating in an information processing machine at least one abstract that is useful during searching and retrieval procedures involving information stored on a record medium, comprising:
  1. sensing by said machine information signals representative of information comprising individual words in a selected language stored on said record medium, each word comprising one or more individual characters;
  2. developing in said machine character signals representative of characters in said system;
  3. categorizing in said machine selected ones of the individual character signals into predefined character groups that are based a probability distribution of the characters represented by said signals in the language selected;
  4. maintaining in said machine an abstract count of the number of character signals categorized into each of said predefined character groups; and
  5. storing said count by said machine on said record medium as an abstract of said information.

49. The method of claim 48 further comprising:
  6. providing in said machine information inquiry signals representative of an inquiry of information comprising at least an individual word in a selected language said word comprising one or more individual inquiry characters;
  7. categorizing in said machine selected ones of the individual character inquiry signals into predefined character groups that are based on a probability distribution of the characters represented by said character signals in the language selected;
  8. maintaining in said machine an inquiry count of the number of character inquiry signals categorized into each of said predefined character groups;
  9. sensing by said machine said abstract count stored on said record medium;
  10. comparing by said machine said inquiry count with said sensed abstract count; and
  11. providing from said machine indication signals representative of a match or mismatch of said abstract and inquiry count signals.

50. A method for generating in an information processing machine at least one abstract that is useful during searching and retrieval procedures involving information stored on a record medium, comprising:
  1. providing by said machine information inquiry signals representative of information comprising at least an individual word in a selected language, said word comprising one or more individual characters;
  2. developing character inquiry signals representative of selected ones only of said individual inquiry characters;
  3. categorizing in said machine individual character inquiry signals into predefined character groups that are based on a probability distribution of the characters represented by said inquiry signals on said record medium in the language selected;
  4. maintaining in said machine an inquiry count of the number of character inquiry signals categorized into each of said predefined character groups; and
  5. referencing in said machine said inquiry count as an inquiry during searching of information stored on said record medium by said machine.

51. A method for generating in an information processing machine at least one abstract that is useful during information searching and retrieval procedures, comprising:
  1. sensing by said machine information inquiry signals representative of information comprising at least an individual word in a selected language, said word comprising one or more individual characters;
  2. developing in said machine character inquiry signals representative of selected ones of said individual inquiry characters;
  3. categorizing in said machine individual character inquiry signals into predefined character groups that are based on a probability distribution of the characters represented by said inquiry signals in the language selected;
  4. maintaining in said machine an inquiry count of the number of character inquiry signals categorized into each of said predefined character groups; and
  5. referencing in said machine said inquiry count as an inquiry during searching of said information by said machine.

52. A method for searching and retrieving information in an information processing machine wherein said information is stored in index groups with individual characters categorized into predefined character groups and with each index group being represented by an abstract count that is based on a probability distribution of said characters in a selected language, comprising:
1. sensing by said machine abstract count signals representative of said stored abstract counts;
2. comparing in said machine an inquiry count signal with said abstract count signals; and
3. providing from said machine indication signals representative of a match or mismatch of said abstract and inquiry count signals.

53. The method of claim 52 further comprising:
manifesting in said machine the index group information related to matched abstract count signals, as by printing said related information on a document, and in response to a match of said inquiry count said signal and abstract count signals.

54. A method for generating in an information processing machine at least one abstract that is useful during information searching and retrieval procedures, comprising:
1. sensing by said machine information signals representative of information comprising individual words in a selected language, each word comprising at least an individual character;
2. developing in said machine signals representative of characters in said system;
3. categorizing in said machine individual character signals into predefined character groups that are based on a probability distribution of the characters represented by said signals in the language selected;
4. maintaining an abstract count by said machine of the number of character signals categorized into each of said predefined character groups;
5. converting in said machine said abstract count to a compressed abstract count form; and
6. storing said compressed abstract count in said machine as an abstract of said information.

55. The method of claim 54 further comprising:
7. providing in said machine an inquiry of information comprising at least an individual word in a selected language, said word comprising at least an individual inquiry character;
8. developing in said machine inquiry signals representative of said at least an individual inquiry character;
9. categorizing in said machine individual character inquiry signals into predefined character groups that are based on a probability distribution of the characters represented by said inquiry signals in the language selected;
10. maintaining in said machine an inquiry count of the number of character inquiry signals categorized into each of said predefined character groups;
11. reconverting in said machine said abstract count from compressed form to a character group count form like said inquiry count;
12. comparing in said machine said inquiry count with said abstract count; and
13. providing from said machine indication signals representative of a match or mismatch of said abstract and inquiry counts.

56. The method of claim 55 wherein each abstract count comprises three non-compatible count characters, and further comprising:
5a. compressing in said machine each abstract count into two apparatus-compatible characters.

57. The method of claim 56 further comprising:
7. generating and recording in said machine a special mark in each apparatus-compatible character to signify that it represents an abstract.

* * * * *